United States Patent
Takahashi et al.

(10) Patent No.: US 7,218,582 B2
(45) Date of Patent: May 15, 2007

(54) OPTICAL DISC DRIVE

(75) Inventors: Rie Takahashi, Hirakata (JP);
Takeharu Yamamoto, Takatsuki (JP);
Takashi Kishimoto, Nara (JP); Kenji Fujiune, Takatsuki (JP); Katsuya Watanabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 668 days.

(21) Appl. No.: 10/735,009

(22) Filed: Dec. 12, 2003

(65) Prior Publication Data

US 2004/0125713 A1    Jul. 1, 2004

(30) Foreign Application Priority Data

Dec. 13, 2002   (JP)   ............................ 2002-362048
Sep. 26, 2003   (JP)   ............................ 2003-334464

(51) Int. Cl.
*G11B 7/00*   (2006.01)

(52) U.S. Cl. .............................. 369/44.32; 369/44.28; 369/44.34

(58) Field of Classification Search ................. None
See application file for complete search history.

(56) References Cited

U.S. PATENT DOCUMENTS 4,782,474 A * 11/1988 Arai et al. ............... 369/44.14
5,181,195 A *  1/1993 Kume et al. ............. 369/44.41
5,663,942 A *  9/1997 Ishibashi et al. ........ 369/53.34

FOREIGN PATENT DOCUMENTS

JP   63-127479 A   5/1988
JP   05-062220     3/1993

* cited by examiner

*Primary Examiner*—Muhammad Edun
(74) *Attorney, Agent, or Firm*—Akin Gump Strauss Hauer & Feld LLP

(57) ABSTRACT

An optical disc drive is used to read and/or write data from/on an optical disc having a data storage layer. The drive corrects electrical offset while reading and/or writing data. The drive updates a correction value based on an electrical offset detected at correcting operation or a value derived using electrical offset values that has been detected and stored, without detecting an electrical offset at correcting operation. Therefore, the optical disc drive can correct the electrical offset less often.

16 Claims, 25 Drawing Sheets

OPTICAL DISC DRIVE

BACKGROUND OF THE INVENTION

1. Field of the Invention

The present invention relates to a technique of correcting an electrical offset and so on to be produced in an electric circuit of an optical disc drive.

2. Description of the Related Art

In reading and/or writing data from/on a given optical disc, an optical disc drive irradiates a target track on the optical disc with a laser beam such that a beam spot is formed right on the track, receives, at a photodetector, the beam that has been reflected from the track, and then converts the optical energy received into an electric signal. In order to focus the laser beam just on the data storage layer of the optical disc and make the beam spot follow exactly the target track on the data storage layer, the optical disc drive generates servo signals representing residual errors based on the electric signal. More specifically, the optical disc drive generates a tracking error signal representing the magnitude of shift of the beam spot from the target track or a focus error signal representing the distance of the focal point from the data storage layer, thereby performing a feedback control on the location of the beam spot and the focal point.

A circuit for generating the servo signals (which will be referred to herein as a "servo signal generator") includes a number of amplifiers. Each of those amplifiers should have an electrical offset, which is hard to eliminate completely. Accordingly, such electrical offsets are superposed one upon the other in the resultant servo signal. If the location of the beam spot or the focal point of the laser beam is controlled with such a servo signal, then the residual error described above is created, thus deteriorating the reading and/or writing performance. For that reason, the conventional optical disc drive takes a measure of correcting such an electrical offset in advance before starting to read and/or write data from/on a given optical disc.

The optical disc drive disclosed in Japanese Laid-Open Publication No. 5-62220 also corrects the electrical offset even while reading and/or writing data. This is because the electrical offset is changeable with the ambient temperature of its associated circuit and needs to be corrected appropriately according to the magnitude of that change.

FIG. 25 shows an exemplary arrangement of functional blocks in a conventional optical disc drive 250. The optical disc drive 250 operates in the following manner. Specifically, first, a laser diode 202 emits a laser beam. Next, the laser beam is transformed by a collimator lens 2003 into a parallel light beam, passed through a beam splitter 2004 and then incident onto an objective lens 2005. In response, the objective lens 2005 converges the parallel light beam, thereby forming a laser beam spot on the data storage layer of a given optical disc 2001. Thereafter, the light beam is reflected back from the data storage layer and then incident onto the objective lens 2005 again, which transforms the reflected light beam into a parallel light beam. Subsequently, the beam splitter 2004 turns the parallel light beam, coming from the objective lens 2005, toward a photodetector 2006. On receiving the parallel light beam, the photodetector 2006 generates and outputs a light quantity signal representing the quantity of the light received. A TE signal generator 2007 generates and outputs a tracking error (TE) signal, representing the magnitude of shift of the location of the laser beam spot from the center of the target track on the optical disc 2001, based on the light quantity signal received.

Meanwhile, in accordance with the light quantity signal, a header detector 2013 detects headers, which are recorded sector by sector as pre-pits on the optical disc 2001, thereby generating a header detection signal. In response to the header detection signal, a detection controller 2008 holds the level of a tracking signal, suspends the emission of the laser beam, and detects the offset of the TE signal. Thereafter, the detection controller 2008 allows the laser diode to emit the laser beam again and stops holding the level of the tracking signal. To perform these control operations, the detection controller 2008 generates various types of control signals. More specifically, in response to the header detection signal, the detection controller 2008 generates and outputs a hold signal to control a control signal generator 2009, a blocking signal to control the laser emission of the laser diode 2002 and a detection control signal to control an offset detector 2010. If the hold signal supplied from the detection controller 2008 instructs that the level of the tracking control signal should be held, then the control signal generator 2009 holds the level of the tracking control signal in accordance with the instruction. If the blocking signal instructs that the laser emission should be stopped, the laser diode 2002 stops emitting the laser beam in accordance with the instruction. And if the detection control signal instructs the offset detector 2010 to detect the offset of the TE signal, the offset detector 2010 follows the instruction.

In accordance with the detection control signal instructing that the offset should be detected, the offset detector 2010 detects the magnitude of electrical offset that has been superposed on the TE signal. Based on the magnitude of offset detected, an offset corrector 2011 generates an offset correction signal representing the magnitude of correction. In accordance with the correction signal generated, the control signal generator 2009 corrects the offset of the TE signal.

The control signal generator 2009 not only corrects the TE signal in accordance with the offset correction signal but also outputs a tracking control signal in accordance with the corrected TE signal such that the beam spot of the laser beam can follow the target track on the optical disc 2001. In response to the tracking control signal, a lens driver 2012 changes the position of the objective lens 2005.

Every time a header is detected during a data reading operation, the optical disc drive 250 corrects the electrical offset of the TE signal. The optical disc drive 250 performs similar operations during a write operation, too.

Thus, even while reading or writing data from/on a given optical disc, the conventional optical disc drive once stops the laser emission and then corrects the electrical offset. That is to say, no data can be read from, or written on, the optical disc while the electrical offset is being corrected. Then, the transfer rate of read data from the optical disc drive to a host computer and the transfer rate of write data from the host computer to the optical disc drive will both decrease so significantly as to make it difficult to always achieve required transfer rates. Particularly when an optical disc drive is expected to read and write a TV program from/on an optical disc simultaneously, the optical disc drive must perform the data reading and writing operations alternately and continuously. For that purpose, such an optical disc drive should achieve much higher transfer rates than conventional ones.

Furthermore, as the storage capacities of optical discs have been significantly increased recently, data must be stored thereon at a higher and higher density. As a result, even higher servo precision is required these days. Thus, the optical disc drive must correct the electrical offset more and more often. In that case, however, the conventional optical disc drive will have to suspend the data reading or writing operation for an even longer amount of time and it will be even harder for the conventional optical disc drive to achieve that high transfer rate expected.

These problems could be solved to a certain extent if the buffer memories of the optical disc drive had an increased storage capacity. However, that is not a beneficial measure to take because the manufacturing cost of the optical disc drive would increase in that situation.

SUMMARY OF THE INVENTION

In order to overcome the problems described above, preferred embodiments of the present invention provide a technique of correcting the electrical offset without decreasing the transfer rate.

An optical disc drive according to a preferred embodiment of the present invention is preferably used to read and/or write data from/on an optical disc including a data storage layer. The optical disc drive preferably includes a light source, a lens, a photodetector, at least one blocker, a servo signal generator, an offset detector, a memory, a calculator, and a corrector. The light source preferably emits light. The lens preferably converges the light. The photodetector preferably detects the light reflected from the optical disc and outputs a read signal. The blocker preferably selectively outputs either the read signal or a predetermined reference signal. The servo signal generator preferably generates a servo signal in response to the output signal of the blocker. The offset detector preferably detects a first type of offsets that have been produced due to one of electric circuits of the servo signal generator. The offset detector preferably regards output values of the servo signal generator, to which the reference signal is supplied, as values of a first type of the offsets while the reference signal is output. The memory preferably stores the first type of offsets detected. The calculator preferably outputs either the first type of actual offset or a second type of offset, as a correction value. The calculator preferably derives the second type of offset based on a variation rate of the first type of offsets stored. The corrector preferably corrects the servo signal in accordance with the correction value.

In one preferred embodiment of the present invention, the optical disc drive preferably further includes a sensor and a decision section. The sensor preferably senses temperature of the servo signal generator. The decision section preferably determines, by the temperature sensed, whether or not the correction value should be updated, thereby generating an update signal, and also determines, by the amount of time that has passed since the correction value was updated last time, whether or not the first type of offset should be detected, thereby generating a detection signal. If the detection signal instructs that the first type of offset should be detected and if the update signal instructs that the correction value should be updated, then the offset detector preferably detects and outputs the first type of actual offset as the correction value.

In an alternative preferred embodiment, the optical disc drive may further include a sensor and a decision section. The sensor preferably senses temperature of the servo signal generator. The decision section preferably determines, by the temperature sensed, whether or not the correction value should be updated to generate an update signal, and also determines, by the amount of time that has passed since the correction value was updated last time, whether or not the first type of offset should be detected, to generate a detection signal. If the detection signal instructs that the first type of offset should not be detected and if the update signal instructs that the correction value should be updated, then the calculator preferably derives the second type of offset.

In another alternative preferred embodiment, the optical disc drive may further include a sensor and a decision section. The sensor preferably senses temperature of the servo signal generator. The decision section preferably determines, by the temperature sensed, whether or not the correction value should be updated to generate an update signal, and also determines, by the amount of time that has passed since the correction value was updated last time, whether or not the first type of offset should be detected to generate a detection signal. If the detection signal instructs that the first type of offset should not be detected and if the update signal instructs that the correction value should not be updated, then the corrector preferably corrects the servo signal in accordance with an actual correction value.

In another preferred embodiment, the optical disc drive preferably further includes a detection controller for generating a blocking signal instructing whether or not the read signal should be blocked. If the detection signal instructs that the first type of offset should be detected, then the detection controller preferably generates the blocking signal instructing that the read signal should be blocked. In response to the blocking signal, the blocker preferably blocks the read signal and passes the predetermined reference signal.

In another preferred embodiment, the optical disc drive preferably further includes a detection controller for generating a blocking signal instructing whether or not the read signal should be blocked. If the detection signal instructs that the first type of offset should be detected, then the detection controller preferably generates the blocking signal instructing that the read signal should be blocked. In response to the blocking signal, the light source preferably stops emitting the light.

In still another preferred embodiment, the optical disc drive preferably further includes a lens driver and a control signal generator. The lens driver preferably changes the position of the lens at least one of directions along the radius of the optical disc and perpendicular to the optical disc in accordance with a control signal. The control signal generator preferably generates the control signal in response to the detection signal. If the detection signal instructs that the first type of offset should be detected, then the control signal generator preferably holds the value of the control signal.

In yet another preferred embodiment, the optical disc drive preferably further includes an amplifier for amplifying the read signal and outputting the amplified signal. The at least one blocker preferably includes a first blocker and a second blocker. The first blocker preferably passes either the read signal or a first predetermined reference signal to the amplifier in response to a first blocking signal, while the second blocker preferably passes either the output signal of the amplifier or a second predetermined reference signal to the servo signal generator. The offset detector preferably further detects the output values of the amplifier, to which the first reference signal is supplied from the first blocker, as a third type of offsets of the amplifier that have been produced due to one of electric circuits of the amplifier. The memory preferably further stores the third type of offsets detected. The calculator preferably outputs one of the third type of actual offset and a fourth type of offset as the correction value. The calculator preferably derives the fourth type of the offset based on a variation rate of the third type of offsets stored and then outputs the fourth type of the offset.

In this particular preferred embodiment, the optical disc drive preferably further includes a first sensor, a second sensor and a decision section. The first sensor preferably senses the temperature of the amplifier. The second sensor preferably senses the temperature of the servo signal generator. The decision section preferably determines, by the temperatures of the amplifier and the servo signal generator sensed, whether or not the correction value should be updated, thereby generating an update signal, and also determines, by the amount of time that has passed since the correction value was updated last time, whether or not the first and third types of offsets need to be detected, thereby generating a detection signal. If the detection signal instructs that the third type of offset should be detected and if the update signal instructs that the correction value should be updated, then the offset detector preferably detects the current offset of the third type and the corrector preferably outputs the current offset of the third type as the correction value.

In yet another preferred embodiment, no matter whether the optical disc drive is reading or writing data from/onto the optical disc, the offset detector preferably detects the first type of offsets, the memory preferably stores the first type of offsets thereon, and the calculator preferably outputs the correction value.

In yet another preferred embodiment, the servo signal is preferably at least one of a tracking error signal and a focus error signal.

In yet another preferred embodiment, if a variation in the temperature sensed has exceeded a predetermined threshold value, the decision section preferably generates the update signal instructing that the correction value should be updated.

In this particular preferred embodiment, the optical disc drive preferably further includes a time keeper for keeping the amount of time passed. If the amount of time passed has exceeded a predetermined threshold value, the decision section preferably generates the update signal instructing that the correction value should be updated.

In yet another preferred embodiment, the optical disc drive preferably further includes a buffer for storing the data thereon. If the update signal instructs that the correction value should be updated, the decision section preferably determines, by the amount of information stored in the buffer, whether or not the first type of offset should be detected, thereby generating the detection signal.

In yet another preferred embodiment, the optical disc drive preferably further includes a temperature memory for storing the values of the temperatures sensed. The calculator preferably derives the second type of offset based on the temperature values stored on the temperature memory and on the first type of offsets.

In a specific preferred embodiment, the temperature memory preferably stores each of the temperature values thereon when an associated one of the offsets of the first type is stored on the memory. The calculator preferably finds two of the temperature values, which are closest to, and next closest to, a current one of the temperature values, from the temperature values on the temperature memory, and preferably derives the second type of offset based on the first type of offsets that were stored on the memory when the two temperature values found were stored on the temperature memory.

An optical disc drive control method according to a preferred embodiment of the present invention is a method for controlling an optical disc drive that is used to read and/or write data from/on an optical disc including a data storage layer. The method preferably includes the steps of: emitting light; converging the light; detecting a portion of the light and outputting a read signal; selectively passing, as an output signal, either the read signal or a predetermined reference signal; generating a servo signal in response to the output signal; detecting the servo signal that has been generated in response to the reference signal as a first type of offset that has been superposed on the servo signal; storing the first type of offsets detected; outputting either a current one of the offsets of the first type or a second type of offset as a correction value with the second type of offset derived based on a variation rate of the first type of offsets stored; and correcting the servo signal in accordance with the correction value.

An optical disc drive according to another preferred embodiment of the present invention is preferably used to read and/or write data from/on an optical disc including a data storage layer. The optical disc drive preferably includes an optical head, a lens driver, a control signal generator, a TE signal generator, an offset detector, an offset corrector, and a stray light regulator. The optical head preferably includes a light source for emitting light, a lens for converging the light and a photodetector for detecting a portion of the light and outputting a read signal. The lens driver preferably changes the position of the lens substantially perpendicularly to the data storage layer in accordance with a control signal. The control signal generator preferably generates the control signal that includes an instruction to move the lens to a position that no light reflected from the optical disc reaches. The TE signal generator preferably generates a first tracking error signal based on the read signal. The offset detector preferably detects an electrical offset that has been produced in the TE signal generator. The offset corrector preferably removes the electrical offset from the first tracking error signal to generate a second tracking error signal. The stray light regulator preferably detects a stray light signal, representing a portion of the light that has been diffused inside of the optical head, in response to the second tracking error signal and preferably removes the stray light signal from the read signal.

An optical disc drive according to still another preferred embodiment of the present invention is preferably used to read and/or write data from/on an optical disc including a data storage layer. The optical disc drive preferably includes an optical head, a level controller, a TE signal generator, an offset detector, an offset corrector, a control signal generator and a lens driver. The optical head preferably includes a light source for emitting light, a lens for converging the light on the optical disc and a photodetector for detecting the light reflected from the optical disc and outputting a first read signal. The level controller preferably generates a second read signal with a level falling within a predetermined range based on the first read signal. The TE signal generator preferably generates a first tracking error signal based on the second read signal. The TE signal generator preferably has a dynamic range defined by the predetermined range. The offset detector preferably detects an electrical offset that has been produced in the TE signal generator. The offset corrector preferably removes the electrical offset from the first tracking error signal to generate a second tracking error signal. The control signal generator preferably generates a control signal based on the second tracking error signal. The lens driver preferably moves the lens across the track in accordance with the control signal such that the light is converged right on the track.

An optical disc drive control method according to another preferred embodiment of the present invention is a method for controlling an optical disc drive that is used to read and/or write data from/on an optical disc including a data storage layer. The method preferably includes the steps of: emitting light; converging the light on the optical disc; detecting the light reflected from the optical disc and outputting a first read signal; generating a second read signal with a level falling within a predetermined range based on the first read signal; generating a first tracking error signal based on the second read signal; detecting an electrical offset that was produced when the first tracking error signal was generated and that is superposed on the first tracking error signal; removing the electrical offset from the first tracking error signal to generate a second tracking error signal; generating a control signal based on the second tracking error signal; and getting the light converged right on the track in accordance with the control signal.

In one preferred embodiment of the present invention, the control method preferably further includes the steps of: performing the step of detecting the electrical offset a number of times at regular intervals; storing respective values of the electrical offsets detected; and estimating, by at least two of the electrical offsets, a value of the electrical offset to be superposed on the first tracking error signal after the electrical offsets have been detected. The step of generating the second tracking error signal preferably includes the step of generating the second tracking error signal based on the estimated value of the electrical offset.

An optical disc drive according to yet another preferred embodiment of the present invention is preferably used to read and/or write data from/on an optical disc including a data storage layer. The optical disc drive preferably includes an optical head, a lens driver, a control signal generator, an FE signal generator, an offset detector, an offset corrector, and a stray light regulator. The optical head preferably includes a light source for emitting light, a lens for converging the light and a photodetector for detecting a portion of the light and outputting a read signal. The lens driver preferably changes the position of the lens substantially perpendicularly to the data storage layer in accordance with a control signal. The control signal generator preferably generates the control signal that includes an instruction to move the lens to a position that no light reflected from the optical disc reaches. The FE signal generator preferably generates a first focus error signal based on the read signal. The offset detector preferably detects an electrical offset that has been produced in the FE signal generator. The offset corrector preferably removes the electrical offset from the first focus error signal to generate a second focus error signal. The stray light regulator preferably detects a stray light signal, representing a portion of the light that has been diffused inside of the optical head, in response to the second focus error signal and preferably removes the stray light signal from the read signal.

An optical disc drive according to yet another preferred embodiment of the present invention is preferably used to read and/or write data from/on an optical disc including a data storage layer. The optical disc drive preferably includes an optical head, a level controller, an FE signal generator, an offset detector, an offset corrector, a control signal generator and a lens driver. The optical head preferably includes a light source for emitting light, a lens for converging the light on the optical disc and a photodetector for detecting the light reflected from the optical disc and outputting a first read signal. The level controller preferably generates a second read signal with a level falling within a predetermined range based on the first read signal. The FE signal generator preferably generates a first focus error signal, representing a positional relationship between a focal point of the light as defined perpendicularly to the optical disc and the data storage layer, based on the second read signal. The FE signal generator preferably has a dynamic range defined by the predetermined range. The offset detector preferably detects an electrical offset that has been produced in the FE signal generator. The offset corrector preferably removes the electrical offset from the first focus error signal to generate a second focus error signal. The control signal generator preferably generates a control signal based on the second focus error signal. The lens driver preferably moves the lens perpendicularly to the optical disc in accordance with the control signal such that the light is focused right on the data storage layer.

An optical disc drive control method according to still another preferred embodiment of the present invention is a method for controlling an optical disc drive that is used to read and/or write data from/on an optical disc including a data storage layer. The method preferably includes the steps of: emitting light; converging the light on the optical disc; detecting the light reflected from the optical disc and outputting a first read signal; generating a second read signal with a level falling within a predetermined range based on the level of the first read signal; generating a first focus error signal based on the second read signal; detecting an electrical offset that was produced when the first focus error signal was generated and that is superposed on the first focus error signal; removing the electrical offset from the first focus error signal to generate a second focus error signal; generating a control signal based on the second focus error signal; and getting the light focused right on the data storage layer in accordance with the control signal.

In one preferred embodiment of the present invention, the control method preferably further includes the steps of: performing the step of detecting the electrical offset a number of times at regular intervals; storing respective values of the electrical offsets detected; and estimating, by at least two of the electrical offsets, a value of the electrical offset to be superposed on the first focus error signal after the electrical offsets have been detected. The step of generating the second focus error signal preferably includes the step of generating the second focus error signal based on the estimated value of the electrical offset.

An optical disc drive according to yet another preferred embodiment of the present invention is preferably used to read and/or write data from/on an optical disc including a data storage layer. The optical disc drive preferably includes an optical head, a lens driver, a control signal generator, a stray light regulator, a level controller, a servo signal generator, an offset detector, and an offset corrector. The optical head preferably includes a light source for emitting light, a lens for converging the light and a photodetector for detecting a portion of the light and outputting a first read signal. The lens driver preferably changes the position of the lens substantially perpendicularly to the data storage layer in accordance with a control signal. The control signal generator preferably generates the control signal that includes a first control signal and a second control signal. The first control signal preferably has an instruction to move the lens to a position that no light reflected from the optical disc reaches, while the second control signal preferably has an instruction to move the lens to a position that the light reflected from the optical disc reaches. The stray light regulator preferably detects a stray light signal, representing a portion of the light that has been diffused inside of the optical head, in response to the first read signal while the lens driver is operating in accordance with the first control signal and preferably holds a correction value associated with the level of the stray light signal detected. The level controller preferably generates a second read signal with a level falling within a predetermined range based on the level of the first read signal while the lens driver is operating in accordance with the second control signal. The servo signal generator preferably generates a first servo signal, representing a positional relationship between a focal point of the light and the optical disc, based on the second read signal. The servo signal generator preferably has a dynamic range defined by the predetermined range. The offset detector preferably detects an electrical offset that has been produced in the servo signal generator. The offset corrector preferably removes the electrical offset from the first servo signal to generate a second servo signal. The stray light regulator preferably corrects the second servo signal based on the correction value.

An optical disc drive according to any of various preferred embodiments of the present invention described above either detects an electrical offset with its servo control operation suspended for just a short time or derives the electrical offset without suspending the servo control operation at all, thereby updating a correction value and correcting the electrical offset. Thus, the optical disc drive has to suspend the data reading or writing operation for a much shorter amount of time and the read or write data can be transferred at a sufficiently high rate from the optical disc drive to a buffer memory, or vice versa.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

Embodiment 1

Figure 1:
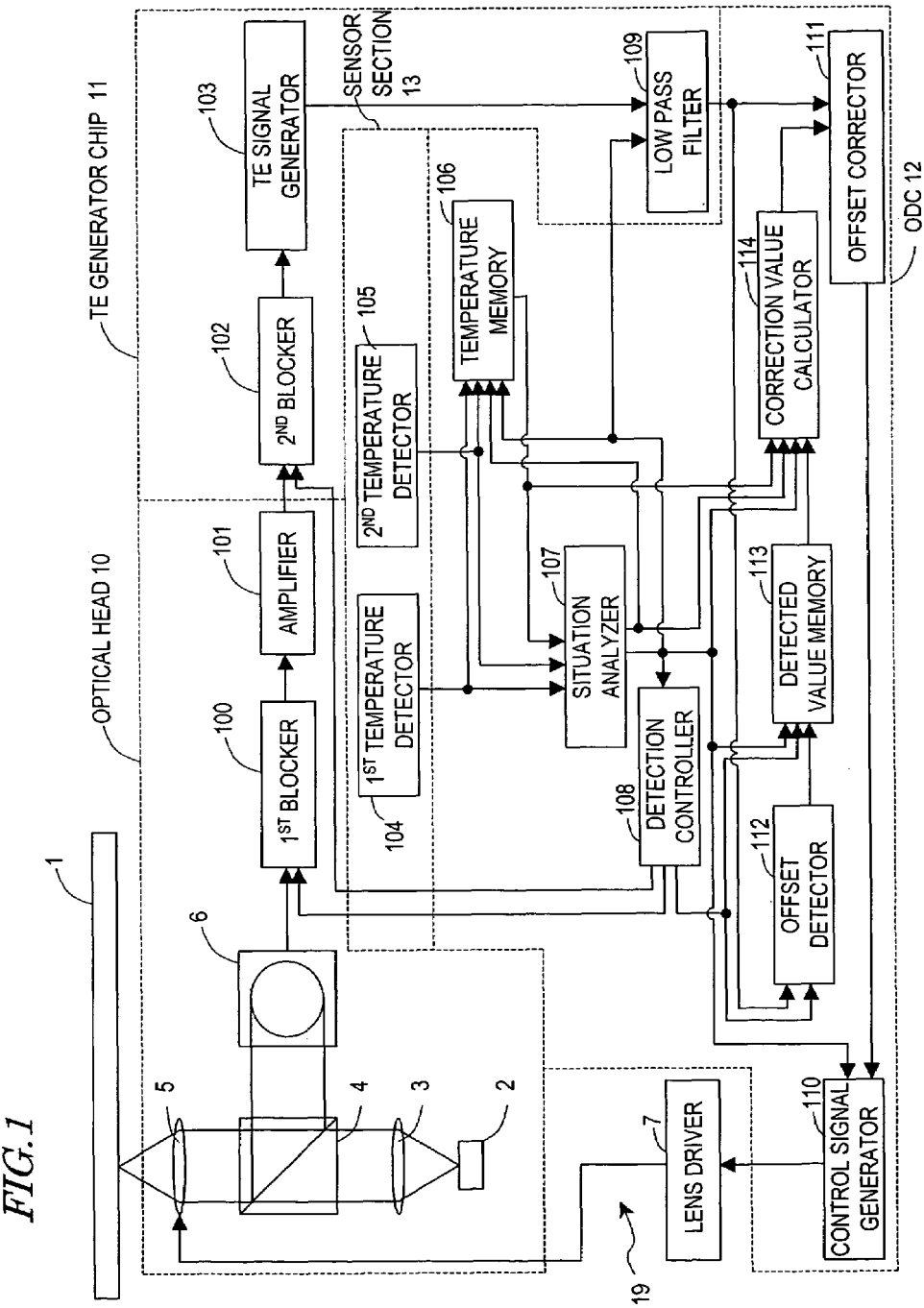
FIG. 1 is a block diagram of an optical disc drive 19 according to a first specific preferred embodiment of the present invention.

FIG. 1 shows an exemplary arrangement of functional blocks for an optical disc drive 19 according to a first specific preferred embodiment of the present invention. As shown in FIG. 1, the optical disc drive 19 preferably includes a lens driver 7, an optical head 10, a TE generator chip 11, an optical disc controller (ODC) 12 and a sensor section 13.

The optical disc drive 19 can read and write data from/on a given optical disc 1 by means of a laser beam. While carrying out the read or write operation, the optical disc drive 19 performs a control operation such that the laser beam is focused just on the data storage layer of the optical disc 1 and that the beam spot of the laser beam follows the target track on the data storage layer. Such a control operation is called a "servo control". The optical disc drive 19 shown in FIG. 1 includes all of the required components for performing a servo control operation according to this first preferred embodiment. Another type of servo control operation will be described later as a second specific preferred embodiment of the present invention.

The optical disc drive may be connected to a host computer such as a personal computer (PC) and may be used as an optical drive thereof. The user can operate the optical disc drive by manipulating the host computer. The read data and/or write data is not directly transferred from the optical disc drive to the host computer, or vice versa, but indirectly by way of a buffer memory (not shown) that is built in the drive. For example, in writing data on an optical disc, the write data that has been transmitted from the host computer is once stored in the buffer memory and then the drive reads out the write data from the buffer memory and writes the data on the optical disc. On the other hand, in reading data from an optical disc, the read data that the drive has read out from the optical disc is once stored in the buffer memory and then the host computer reads out the data from the buffer memory. Although no components for performing the read and write operations are specifically shown in FIG. 1, these read and write operations may be carried out with known components and by conventional processing techniques. Thus, the description thereof will be omitted herein.

The optical disc 1 for use in various preferred embodiments of the present invention is preferably a disk-like storage medium such as a CD, a DVD-ROM, a DVD-RAM, a DVD-RW, a DVD-R, a DVD+RW, DVD+R or a BD (Blu-ray disc). Hereinafter, the respective components of the optical disc drive 19 shown in FIG. 1 will be described one by one.

In accordance with a tracking control signal, the lens driver 7 generates and outputs a drive signal, thereby changing the position of an objective lens 5 (to be described below) along the radius of the optical disc 1. For example, while the level of the tracking control signal is being held, the lens driver 7 continuously outputs the previous drive signal. On the other hand, if the level of the tracking control signal is no longer held, the lens driver 7 outputs a drive signal associated with the tracking control signal. It should be noted that the lens driver 7 actually can change the position of the objective lens 5 not just along the radius of the optical disc 1 but also perpendicularly to the data storage layer of the optical disc 1. However, the latter control operation (i.e., a focus control operation) is not the key in this preferred embodiment and the description thereof will be omitted herein.

The optical head 10 preferably includes a laser diode 2, a collimator lens 3, a beam splitter 4, an objective lens 5, a light quantity detector 6, a first blocker 100 and an amplifier 101.

The laser diode 2 emits a laser beam, of which the wavelength is changeable with the type of the given optical disc 1. For example, if the optical disc 1 loaded is a BD, then the laser beam has a wavelength of about 405 nm. The collimator lens 3 transforms the laser beam, emitted from the laser diode 2, into a parallel beam. The beam splitter 4 transmits the parallel beam, which has gone out of the collimator lens 3, toward the objective lens 5. Also, after the beam has been reflected from the optical disc 1 and passed through the objective lens 5, the beam splitter 4 turns the parallel beam toward the light quantity detector 6. The objective lens 5 converges the parallel beam, which has passed through the collimator lens 3 and the beam splitter 4, thereby forming a laser beam spot on the data storage layer of the optical disc 1. Also, the objective lens 5 transforms the light beam that has been reflected from the data storage layer into a parallel beam and then passes the parallel beam to the beam splitter 4 as described above. On receiving the parallel beam from the beam splitter 4, the light quantity detector 6 generates and outputs a light quantity signal representing the quantity of the light received. For example, the light quantity detector 6 may be a photodetector for outputting a photo current in an amount that is proportional to the quantity of light received. A signal representing this photo current is obtained by reading data from the optical disc 1 and will be referred to herein as a "read signal".

If a first blocking signal supplied from a detection controller 108 (to be described later) is high, then the first blocker 100 outputs a reference voltage. On the other hand, if the first blocking signal is low, then the first blocker 100 passes the output light quantity signal of the light quantity detector 6 as it is. The amplifier 101 amplifies and outputs the signal supplied from the first blocker 100. It should be noted that if the light quantity signal is passed as it is through the first blocker 100, then the amplified signal is substantially no different from the read signal.

The TE generator chip 11 preferably includes a second blocker 102, a TE signal generator 103, and a low pass filter 109. The TE generator chip 11 may be implemented as a semiconductor integrated circuit, for example.

If a second blocking signal supplied from the detection controller 108 (to be described later) is high, then the second blocker 102 outputs a reference voltage. On the other hand, if the second blocking signal is low, then the second blocker 102 passes the output signal of the amplifier 101 as it is.

Based on the output signal of the second blocker 102, the TE signal generator 103 generates and outputs a tracking error (TE) signal representing the magnitude of shift of the beam spot of the laser beam from the center of the target track on the optical disc 1.

The low pass filter 109 filters out excessive frequency components, which exceed a highest frequency required for a tracking control operation from the output TE signal of the TE signal generator 103, thereby extracting frequency components that are equal to, or lower than, the highest frequency (i.e., the cutoff frequency). For example, in the case that the optical disc 1 is a BD which rotates at normal rate (i.e. 1× read/write rate), frequency components that are equal to, or lower than 100 kHz are extracted. Also, if the output detection signal of a situation analyzer 107 (to be described later) is high, then the low pass filter 109 may increase the cutoff frequency to approximately 500 kHz for the above BD, for example. On the other hand, if the output detection signal is low, then the low pass filter 109 may decrease the cutoff frequency to approximately 100 kHz for the above BD, for example. As long as its cutoff frequency is variable, the low pass filter 109 may be either an analog filter or a digital filter. It should be noted that the TE generator chip 11 may be provided as a DSP on the ODC 12 to be described below. In that case, the TE generator chip 11 and the ODC 12 do not have to be regarded as two discrete circuit sections but may be treated as an integrated one.

The sensor section 13 includes a first temperature detector 104 and a second temperature detector 105, each of which may be implemented as a sensor. The first temperature detector 104 detects the internal or ambient temperature of the amplifier 101, thereby outputting a first temperature signal. The second temperature detector 105 detects the internal or ambient temperature of the TE signal generator 103, thereby outputting a second temperature signal.

The optical disc controller (ODC) 12 preferably includes a temperature memory 106, the situation analyzer 107, the detection controller 108, the control signal generator 110, an offset corrector 111, an offset detector 112, a detected value memory 113, and a correction value calculator 114. The ODC 112 preferably includes at least one digital signal processor (DSP) and a volatile or nonvolatile memory. The DSP is a so-called computer and executes a computer program stored on the memory, thereby carrying out the functions of the respective components described above. It should be noted that if the computer program for the DSP is changed, then the ODC of this first preferred embodiment may be modified into the counterpart of the second, third or fourth preferred embodiment to be described later. Each of these computer programs is described so as to carry out the respective processing steps shown in the flowchart that will be referred to when its associated preferred embodiment is described. Hereinafter, these functional blocks will be described one by one.

In response to a detection signal and an update signal to be described later, the temperature memory 106 stores the first and second temperature signals that are supplied from the first and second temperature detectors 104 and 105, respectively.

In accordance with the values of the first and second temperature signals and the values stored in the temperature memory 106, the situation analyzer 107 outputs the update signal and detection signal. More details about the configuration of the situation analyzer 107 and update and detection signals will be described later.

In response to the detection signal, the detection controller 108 outputs the first blocking signal, second blocking signal and detection control signal as respective digital signals.

If the detection signal is low, the control signal generator 110 outputs a tracking control signal in response to the output signal of the offset corrector 111 such that the beam spot of the laser beam follows the target track on the optical disc 1. On the other hand, if the detection signal is high, the control signal generator 110 holds (or fixes) the value of the tracking control signal at the actual one. The offset corrector 111 corrects the electrical offset included in the output signal of the low pass filter 109. More specifically, the offset corrector 111 subtracts the output signal value of the correction value calculator 114 from the output signal value of the low pass filter 109 and outputs the remainder.

On receiving a high-level detection control signal from the detection controller 108, the offset detector 112 detects the electrical offset, thereby outputting an offset signal.

The detected value memory 113 stores the offset signal value, supplied from the offset detector 112, in response to the detection signal and detection control signal supplied from the detection controller 108.

In response to the update signal and detection signal, the correction value calculator 114 reads out the stored values from the detected value memory 113 and temperature memory 106, calculates a correction value for the electrical offset, and outputs a correction signal. Also, responsive to the update signal, the correction value calculator 114 holds the value of the correction signal.

Hereinafter, the respective components of the ODC 12 will be described in further detail.

Figure 2:
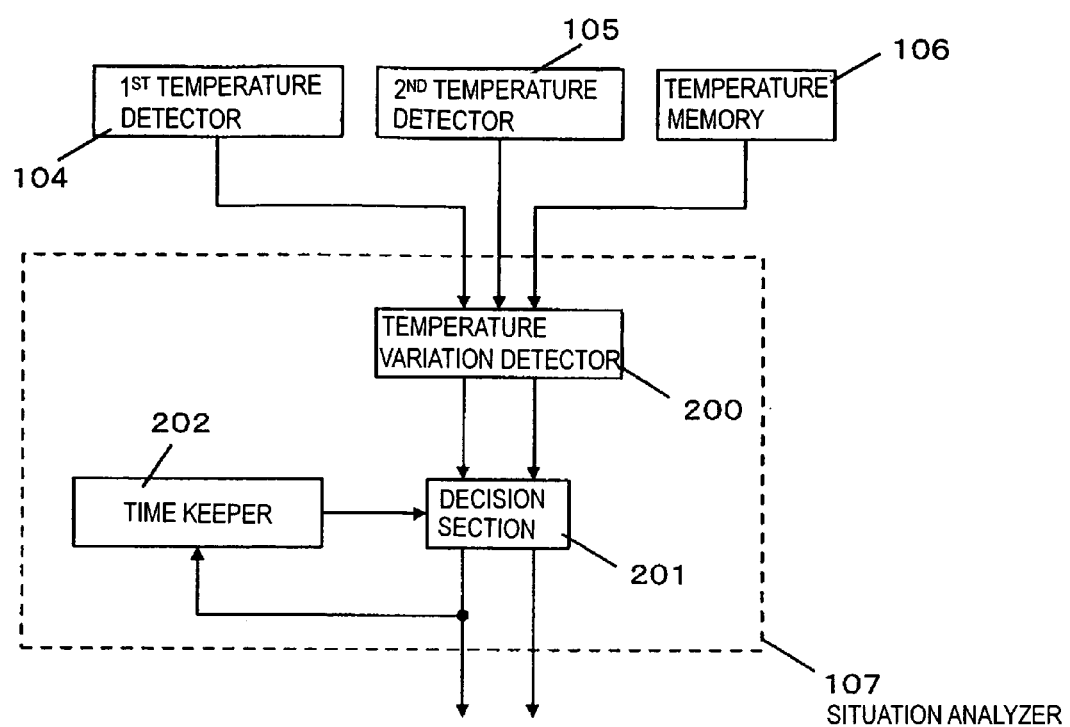
FIG. 2 is a block diagram of the situation analyzer 107 shown in FIG. 1.

FIG. 2 shows an exemplary arrangement of functional blocks for the situation analyzer 107. The situation analyzer 107 preferably includes a temperature variation detector 200, a decision section 201 and a time keeper 202.

The temperature variation detector 200 reads out the stored value from the temperature memory 106 and calculates the difference between the first temperature signal value supplied from the first temperature detector 104 and the value stored in the temperature memory 106, thereby outputting a first temperature variation signal. The first temperature variation signal represents the absolute value of the difference. Also, the temperature variation detector 200 calculates the difference between the second temperature signal value supplied from the second temperature detector 105 and the value stored at address No. 2 (to be described later) in the temperature memory 106, thereby outputting a second temperature variation signal representing the absolute value of the difference. The temperature memory 106 has a plurality of information storage areas. It will be described later from what information storage area the temperature variation detector 200 should read out the stored value.

The decision section 201 normally outputs a low-level update signal. Once the value of the first temperature variation signal or the second temperature variation signal exceeds a predetermined threshold value, the decision section 201 maintains the update signal at high level for a predetermined amount of time. Also, in accordance with the update signal and the output time-keeping signal of the time keeper 202, the decision section 201 outputs the detection signal. The update signal and the detection signal are digital pulse signals.

The time keeper 202 calculates the amount of time that has passed since a pulse of the detection signal rose, thereby outputting the time-keeping signal representing the calculated amount of time passed. Also, every time a pulse of the detection signal rises, the time keeper 202 resets the value of the time-keeping signal to zero.

Next, the information storage areas of the temperature memory 106 will be described and then it will be described how the situation analyzer 107 operates using the temperature memory 106.

The temperature memory 106 includes six information storage areas, which will be specified herein by addresses Nos. 1, 2, 3, 4, 5 and 6, respectively. The information stored in each of these areas is known in advance. More specifically, a first temperature signal value is stored in the area specified by address No. 1, a second temperature signal value is stored in the area specified by address No. 2, first temperature signal values are stored in the areas specified by addresses Nos. 3 and 4, and second temperature signal values are stored in the areas specified by addresses Nos. 5 and 6.

The values of the first temperature signal are stored in three different areas and those of the second temperature signal are also stored in three different areas such that these stored values can be updated at mutually different times. Specifically, the values stored in the areas specified by addresses Nos. 1 and 2 are modified responsive to the update signal, while the values stored in the areas specified by addresses Nos. 3, 4, 5 and 6 are modified responsive to the detection signal.

Hereinafter, it will be described with reference to FIG. 3 how and when to operate the temperature memory 106 and situation analyzer 107.

Figure 3:
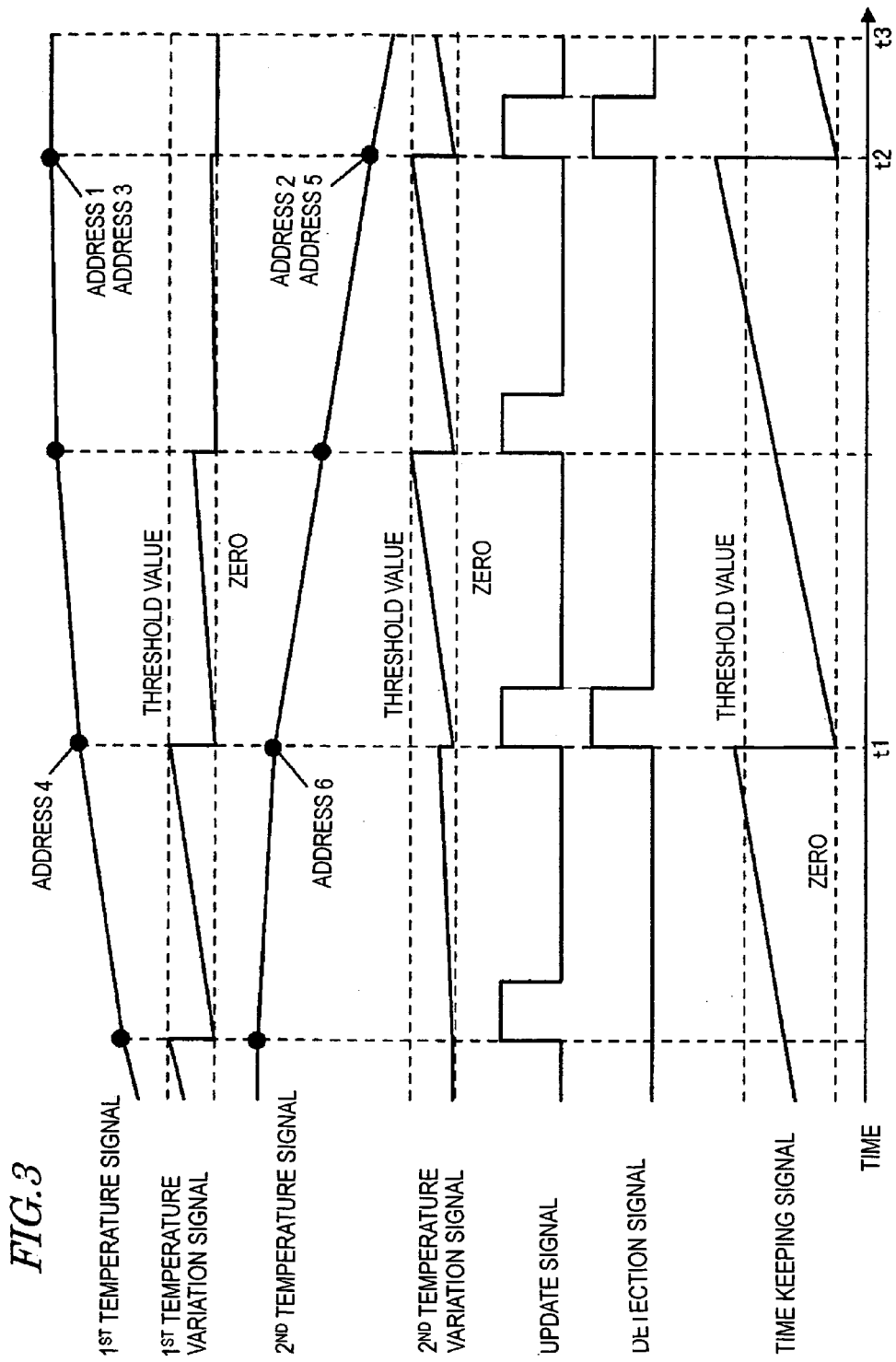
FIG. 3 is a timing diagram showing the waveforms of signals that are associated with the situation analyzer 107.

FIG. 3 is a timing diagram showing the waveforms of signals that are associated with the situation analyzer 107.

The first temperature signal is sampled on the leading edge of each pulse of the update signal (i.e., as indicated by the dashed lines that are drawn perpendicularly to the time axis) and the sampled value is stored in the area specified by address No. 1 in the temperature memory 106. The sampled and stored values of the first temperature signal are indicated by solid circles for reference.

The first temperature variation signal represents the absolute value of the difference that is obtained by subtracting the value stored in the area specified by address No. 1 in the temperature memory 106 from the value of the first temperature signal. Thus, whenever each pulse of the update signal rises, the value of the first temperature signal is equal to the value stored in the area specified by address No. 1, and therefore, the first temperature variation signal is zero.

The second temperature signal is also sampled on the leading edge of each pulse of the update signal and the sampled value is stored in the area specified by address No. 2 in the temperature memory 106. The sampled and stored values of the second temperature signal are also indicated by solid circles ● for reference.

The second temperature variation signal represents the absolute value of the difference that is obtained by subtracting the value stored in the area specified by address No. 2 in the temperature memory 106 from the value of the second temperature signal. Thus, whenever each pulse of the update signal rises, the value of the second temperature signal is equal to the value stored in the area specified by address No. 2, and therefore, the second temperature variation signal is zero.

Whenever each pulse of the detection signal rises, the temperature memory 106 transfers the value that has been stored in the area specified by address No. 3 to the area specified by address No. 4, and then stores the value of the first temperature signal in the area specified by address No. 3. Also, the temperature memory 106 transfers the value that has been stored in the area specified by address No. 5 to the area specified by address No. 6, and then stores the value of the second temperature signal in the area specified by address No. 5.

As described above, the update signal is normally low. And once either the value of the first temperature variation signal or that of the second temperature variation signal exceeds a predetermined threshold value, the update signal is kept high for a certain amount of time. The high-level update signal instructs that the value stored in the temperature memory 106 should be updated, while the low-level update signal instructs that the value stored in the temperature memory 106 should be held (i.e., should not be updated).

The detection signal is also normally low. However, if the value of the time-keeping signal is higher than a predetermined threshold value at the leading edge of a pulse of the update signal, then the detection signal is kept high for a certain amount of time. That is to say, the detection signal represents the result of decision on whether or not the amount of time that has passed since the detection signal was reset last time has exceeded the predetermined threshold value. The high-level detection signal instructs that detection should be carried out, while the low-level detection signal instructs that no detection should be carried out. It should be noted that each pulse of the detection signal and its associated pulse of the update signal fall at the same time.

The time keeping signal is reset to zero when each pulse of the detection signal rises and then changes its value proportionally to the amount of time passed after that. The time keeping signal shown in FIG. 3 increases its value proportionally to the amount of time passed. Thus, the amount of time passed since the detection signal was reset can be calculated based on the value of the time keeping signal.

The relationship between the respective signals will be further described with reference to FIG. 3. Every time the variation in either the internal or ambient temperature of the amplifier 101 or that of the TE signal generator 103 reaches a predetermined value as measured since the update signal rose last time, the update signal is kept high for a certain amount of time. Also, at that point in time, if a predetermined amount of time has already passed since the detection signal rose last time, then the detection signal is kept high for a certain amount of time.

For example, look at the times t1, t2 and t3 shown in FIG. 3. Supposing the time t3 is the present time, the time t2 is synchronous with the leading edge of the last pulse of the detection signal, and the time t1 is synchronous with the leading edge of the second last pulse of the detection signal.

In the area specified by address No. 1 in the temperature memory 106, the value of the first temperature signal at the time t2 is stored. In the same way, the value of the second temperature signal at the time t2 is stored in the area specified by address No. 2. The value of the first temperature signal at the time t2 is also stored in the area specified by address No. 3. The value of the first temperature signal at the time t1 is stored in the area specified by address No. 4. The value of the second temperature signal at the time t2 is also stored in the area specified by address No. 5. And the value of the second temperature signal at the time t1 is stored in the area specified by address No. 6. That is to say, in the areas specified by addresses Nos. 1 and 2, the values of the first and second temperature signals when the update signal rose last time are respectively stored irrespective of the value of the detection signal. In the areas specified by addresses Nos. 3 and 5, the values of the first and second temperature signals when the update and detection signals both rose last time are respectively stored. And in the areas specified by addresses Nos. 4 and 6, the values of the first and second temperature signals when the update and detection signals both rose second last time are respectively stored.

Figure 4:
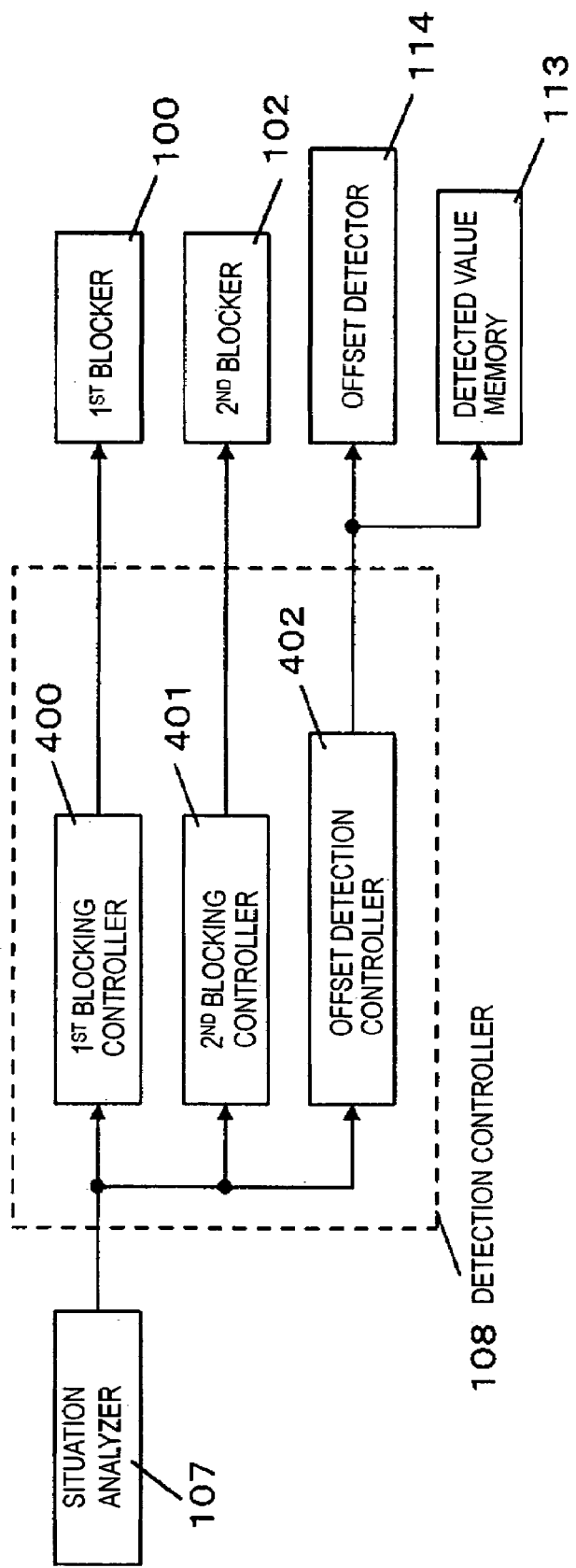
FIG. 4 is a block diagram of the detection controller 108 shown in FIG. 1.

Hereinafter, the detection controller 108 of the ODC 12 will be described in detail. FIG. 4 shows an exemplary arrangement of functional blocks for the detection controller 108. The detection controller 108 preferably includes a first blocking controller 400, a second blocking controller 401 and an offset detection controller 402, each of which operates based on the amount of time that has passed since the detection signal, supplied from the situation analyzer 107, rose last time.

The first blocking controller 400 generates a first blocking signal and outputs it to the first blocker 100. The second blocking controller 401 generates a second blocking signal and outputs it to the second blocker 102. The offset detection controller 402 generates a detection control signal and outputs it to the offset detector 114 and detected value memory 113. These signals will be described in detail below with reference to FIG. 5.

Figure 5:
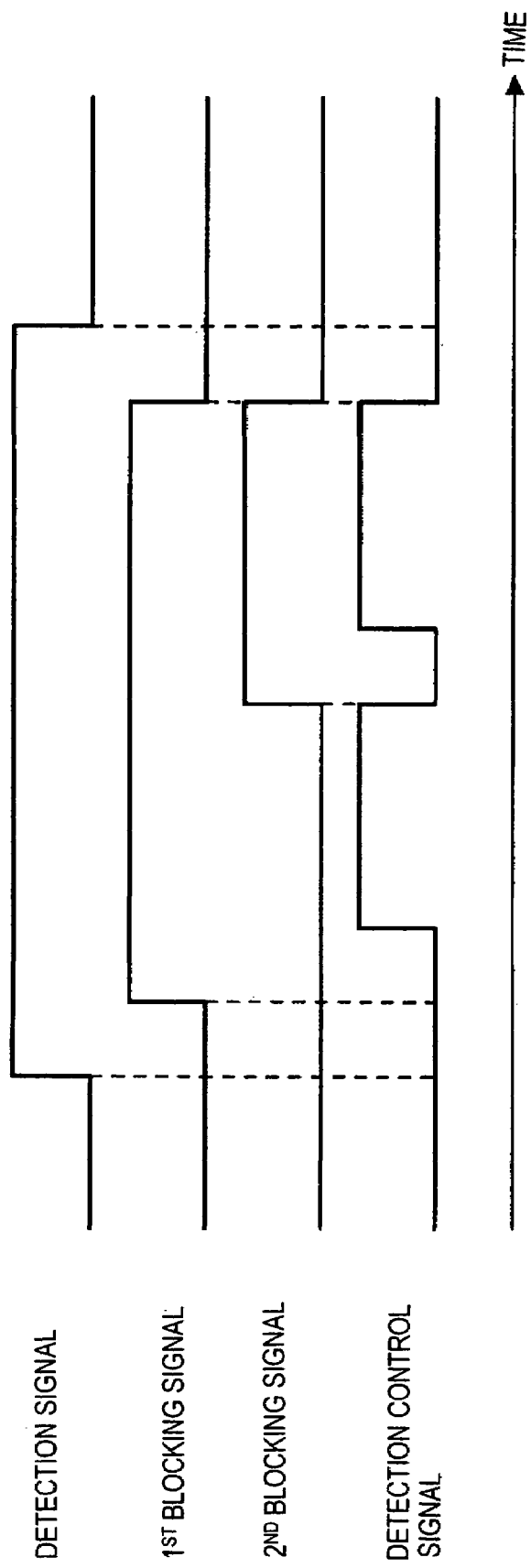
FIG. 5 is a timing diagram showing the waveforms of signals that are associated with the detection controller 108.

FIG. 5 is a timing diagram showing the waveforms of those signals that are associated with the detection controller 108. As already described with reference to FIG. 3, the detection signal is supplied from the decision section 201. The leading edge of the first blocking signal is behind that of its associated detection signal pulse, and the trailing edge thereof is ahead of that of the detection signal pulse. The leading edge of the second blocking signal is behind that of its associated first blocking signal pulse and the trailing edge thereof is synchronous with that of the first blocking signal pulse. While the first blocking signal is high, two pulses of the detection control signal are generated. The leading edge of the first pulse is behind that of its associated first blocking signal pulse while the trailing edge of the first pulse is synchronous with the leading edge of its associated second blocking signal pulse. The leading edge of the second pulse is behind that of its associated second blocking signal pulse while the trailing edge of the second pulse is synchronous with those of its associated first and second blocking signal pulses.

Next, the offset detector 112 will be described. On receiving a high-level detection control signal from the detection controller 108, the offset detector 112 detects the output signal value of the low pass filter 109. As will be described later, a signal component resulting from an electrical offset is included in the output signal of the low pass filter 109 at this time. Thus, the offset detector 112 is provided to detect that value.

Hereinafter, the detected value memory 113 will be described in detail. The detected value memory 113 has five information storage areas, which will be specified herein by addresses Nos. 7, 8, 9, 10 and 11, respectively. The detected value memory 113 counts the respective pulses of the detection control signal to find how many pulses have been generated since the leading edge of its associated detection signal. And on the trailing edge of each detection control signal pulse supplied from the detection controller 108, the detected value memory 113 stores the output offset signal value of the offset detector 112. If the pulse of the detection control signal is a pulse that has been generated for the first time since the detection signal rose, then the detected value memory 113 stores the value of the offset signal, associated with the trailing edge thereof, in the information storage area specified by address No. 11. If the detection control signal pulse is a pulse generated for the second time, then the detected value memory 113 stores the value of the offset signal, associated with the trailing edge thereof, in the information storage area specified by address No. 8. Furthermore, the detected value memory 113 subtracts the value stored at address No. 8 from the value stored at address No. 11, and then stores the remainder at address No. 7. As a result of these operations, a value including an electrical offset that is produced in the amplifier 101 when the detection signal is high is stored in the area specified by address No. 7. In the area specified by address No. 8 on the other hand, the values of electrical offsets that are produced in the TE signal generator 103 and low pass filter 109 when the detection signal is high are stored.

Also, the detected value memory 113 transfers the value that has been stored at address No. 7 to address No. 9 and the value that has been stored at address No. 8 to address No. 10, respectively, on the leading edge of the detection signal pulse.

As a result of these operations, the value including the electrical offset produced in the amplifier 101, which was updated and detected last time, is stored at address No. 7 in the detected value memory 113, while the values including the electrical offsets produced in the TE signal generator 103 and low pass filter 109, which were also updated and detected last time, are stored at address No. 8. On the other hand, the value including the electrical offset produced in the amplifier 101, which was updated and detected second last time, is stored at address No. 9 in the detected value memory 113, while the values including the electrical offsets produced in the TE signal generator 103 and low pass filter 109, which were also updated and detected second last time, are stored at address No. 10. And the values including the electrical offsets produced in the amplifier 101, the TE signal generator 103 and low pass filter 109, which were updated and detected last time, are all stored at address No. 11.

Next, the correction value calculator 114 will be described in detail.

Figure 6:
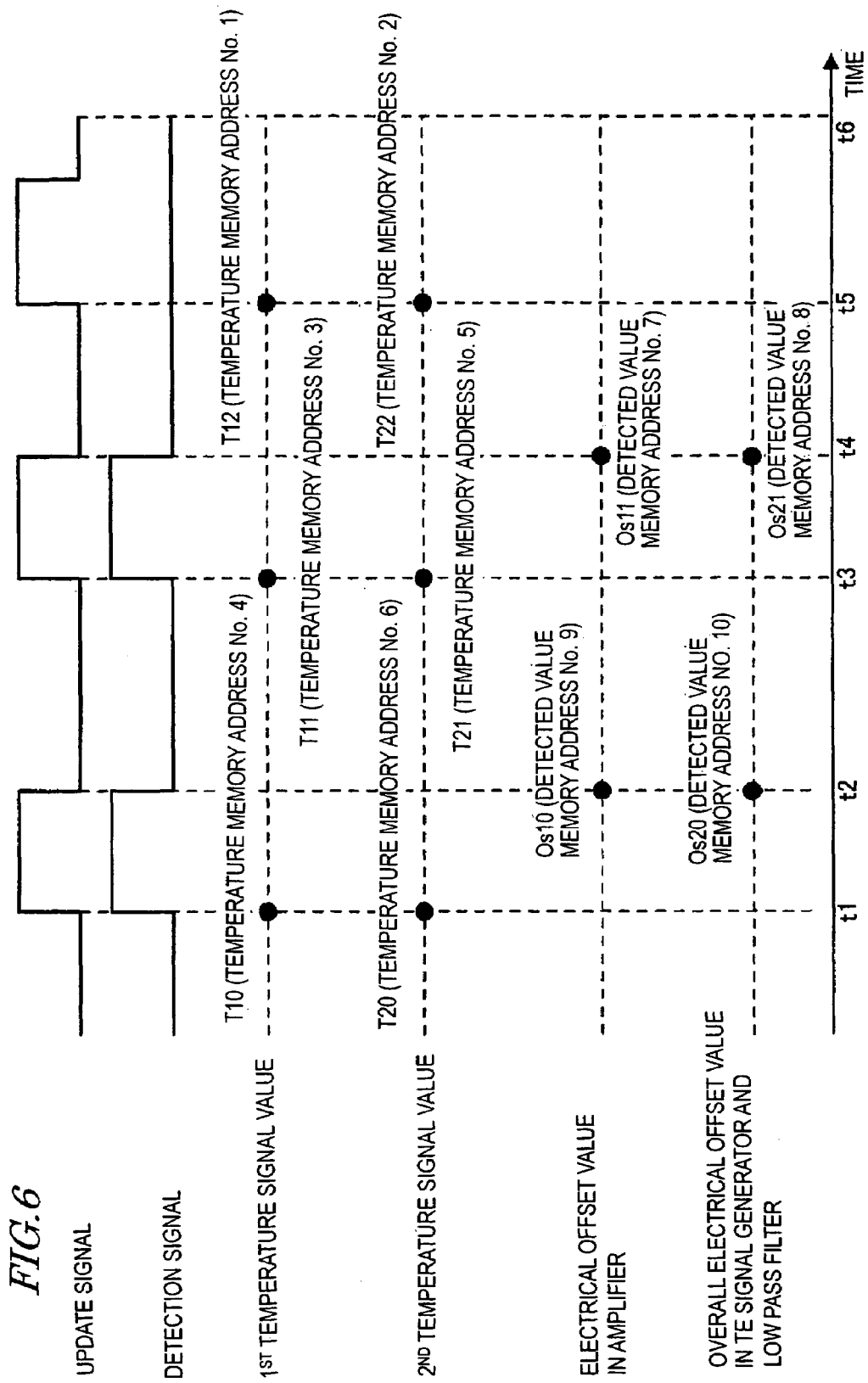
FIG. 6 shows how the values stored on the temperature memory 106 and detected value memory 113 shown in FIG. 1 change with the detection signal and update signal.

FIG. 6 shows a relationship between the values stored in the temperature memory 106 and detected value memory 113 and the detection and update signals. To calculate the correction value, the correction value calculator 114 needs the values of the first and second temperature signals, the value of the electrical offset produced in the amplifier 101 and the values of the electrical offsets produced in the TE signal generator 103 and low pass filter 109.

Suppose t6 is the present time. In that case, the leading edge of the last detection signal pulse is synchronous with the time t3, while the leading edge of the second last detection signal pulse is synchronous with the time t1. Also, the trailing edge of the last detection signal pulse is synchronous with the time t4, while the trailing edge of the second last detection signal pulse is synchronous with the time t2. Furthermore, the leading edge of the last update signal pulse is synchronous with the time t5.

In the area specified by address No. 4 in the temperature memory 106, the value T10 of the first temperature signal at the time t1 is stored. The value T11 of the first temperature signal at the time t3 is stored in the area specified by address No. 3. And the value T12 of the first temperature signal at the time t5 is stored in the area specified by address No. 1.

On the other hand, in the area specified by address No. 6 in the temperature memory 106, the value T20 of the second temperature signal at the time t1 is stored. The value T21 of the second temperature signal at the time t3 is stored in the area specified by address No. 5. And the value T22 of the second temperature signal at the time t5 is stored in the area specified by address No. 2.

In the area specified by address No. 9 in the detected value memory 113, the value Os10 of the electrical offset produced in the amplifier 101 around the time t2 is stored. On the other hand, the value Os11 of the electrical offset produced in the amplifier 101 around the time t4 is stored in the area specified by address No. 7 in the detected value memory 113.

In the area specified by address No. 10 in the detected value memory 113, the overall value Os20 of the electrical offsets produced in the TE signal generator 103 and low pass filter 109 around the time t2 is stored. On the other hand, the overall value Os21 of the electrical offsets produced in the TE signal generator 103 and low pass filter 109 around the time t4 is stored in the area specified by address No. 8 in the detected value memory 113.

Next, it will be described how the correction value calculator 114 calculates the correction value. The correction value calculator 114 separately calculates a correction value for the electrical offset that has been produced in the amplifier 101 and a correction value for the overall value of electrical offsets that have been produced in the TE signal generator 103 and low pass filter 109. Then, the correction value calculator 114 adds the former and latter correction values together to obtain an overall correction value in the end. After the detection and update signals supplied from the situation analyzer 107 have fallen, the correction value calculator 114 calculates the correction values.

Suppose the correction value that has been newly calculated by the correction value calculator 114 for the amplifier 101 is identified by C1, the correction value that has been newly calculated by the correction value calculator 114 for the TE signal generator 103 and low pass filter 109 is identified by C2, and the correction value to be output in the end is identified by C.

First, if the update and detection signals are both high, then the correction value C1 is Os11 and the correction value C2 is Os21. The correction value C to be output finally is (C1+C2). That is to say, the electrical offset in that situation has already been detected by the offset detector 112 and the correction value calculator 114 uses the detected electrical offset value as the correction value as it is.

On the other hand, if the update signal is high while the detection signal is low, then the correction value calculator 114 calculates the correction value C1 by the following Equation (1) and the correction value C2 by the following Equation (2), respectively:

$$C1=(Os11-Os10)\times(T12-T11)/(T11-T10)+Os11 \quad (1)$$

$$C2=(Os21-Os20)\times(T22-T21)/(T21-T20)+Os21 \quad (2)$$

The correction value C to be output finally is (C1+C2). That is to say, no electrical offset is detected then, and therefore, the correction value calculator 114 estimates the electrical offset value from its past values and uses the estimated value as the correction value. Specifically, the correction value calculator 114 calculates the estimated electrical offset value based on the variation rate of the electrical offset on the supposition that the electrical offset changes linearly with the temperature. The electrical offset values used are values that were detected last time and second last time and the temperatures at the times of detection are also used.

Hereinafter, it will be described with reference to FIG. 7 exactly how the optical disc drive 19 of this first preferred embodiment operates.

Figure 7:
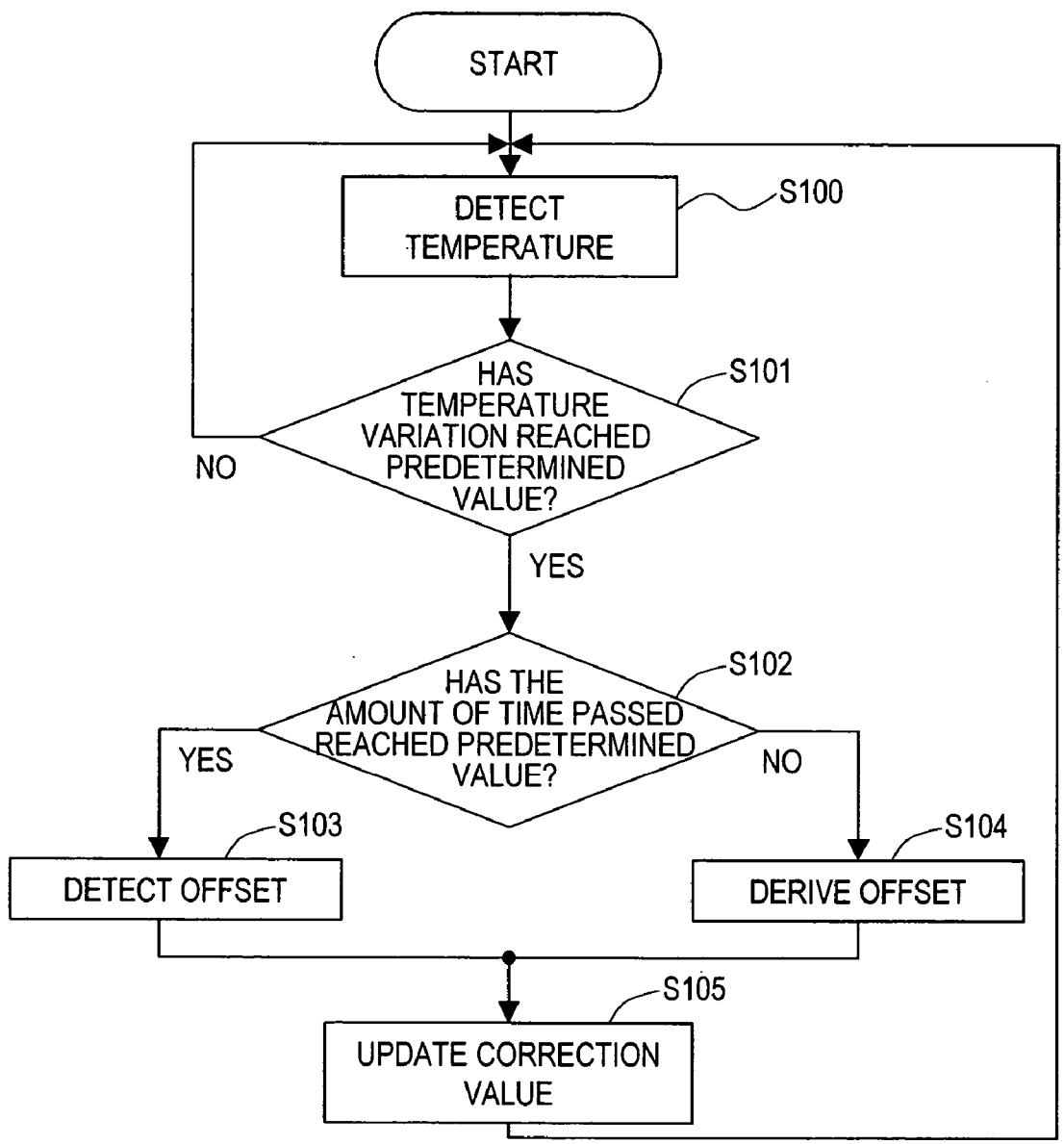
FIG. 7 is a flowchart showing how the optical disc drive 19 operates.

FIG. 7 shows an exemplary procedure in which the optical disc drive 19 operates. First, in Step S100, the first and second temperature detectors 104 and 105 detect the temperatures of the amplifier 101 and TE signal generator 103, respectively. Next, in Step S101, the situation analyzer 107 determines whether or not the temperature of the amplifier 101 or that of the TE signal generator 103 has changed by a predetermined value or more since the offset correction value was updated last time. If the answer is NO, the processing goes back to the previous step S100. On the other hand, if the answer is YES, the processing advances to the next step S102. In that next step S102, the situation analyzer 107 determines whether or not a predetermined amount of time has passed since the electrical offset was detected last time. If the answer is YES, then the processing advances to Step S103. Otherwise, the processing advances to Step S104.

In Step S103, the offset detector 112 detects the offset. Hereinafter, the offset detection process will be described in detail with reference to FIGS. 1 and 5. First, when the situation analyzer 107 generates the detection signal (i.e., when the detection signal rises to the high level), the control signal generator 110 holds the previous or current value of the tracking control signal. While the value of the tracking control signal is being held in this manner, the lens driver 7 outputs a drive signal instructing that the objective lens 5 be fixed. Once the objective lens 5 is fixed at a position with respect to the optical disc 1, the laser beam spot is also fixed at a radial location on the optical disc 1 where the beam spot has been until the tracking control signal value is held.

When the detection signal rises to the high level, the low pass filter 109 switches its cutoff frequency into a higher value. In the interval between the leading edge of the detection signal pulse and that of the first blocking signal pulse, the control signal generator 110 holds the level of the tracking control signal. It should be noted that this holding interval includes the time it takes to switch the frequencies of the low pass filter 109.

After the low pass filter 109 has switched the cutoff frequencies, the detection controller 108 generates the first blocking signal (i.e., the first blocking signal rises to the high level). In response, the first blocker 100 switches its output signal into a reference signal having a predetermined reference voltage. In other words, the first blocker 100 outputs the read signal of which the voltage has been switched into the reference voltage. At this point in time, the output signal value of the low pass filter 109 represents the value of the electrical offset that is produced in the circuit section ranging from the input terminal of the amplifier 101 to the output terminal of the low pass filter 109. For example, supposing the reference voltage is Vr1 and the output of the low pass filter 109 is Vo1, the offset detector 112 detects (Vo1−Vr1) as the electrical offset at the timing to be described later. Vr1 is a predefined value. When Vr1=0, for example, Vo1 itself can be detected as the electrical offset.

It should be noted that the time it takes for the output signal of the low pass filter 109 to settle at the electrical offset value depends on the higher cutoff frequency of the low pass filter 109. The interval between the leading edge of the first blocking signal pulse and that of the first pulse of the detection control signal is defined so as to include this settling time.

After the output signal value of the low pass filter 109 has settled at the electrical offset value, the detection control signal rises to the high level and the offset detector 112 detects the electrical offset value. The detected value is stored in the detected value memory 113. The width of the first pulse of the detection control signal is defined so as to be long enough for the offset detector 112 to detect the electrical offset value.

When the electrical offset is detected successfully, the second blocking signal rises to the high level. In response, the second blocker 102 switches its output signal into a reference signal having a predetermined reference voltage. At this point in time, the output signal value of the low pass filter 109 represents the value of the electrical offset that is produced in the circuit section ranging from the input terminal of the TE signal generator 103 to the output terminal of the low pass filter 109. For example, supposing the reference voltage is Vr2 and the output of the low pass filter 109 is Vo2, the offset detector 112 detects (Vo2−Vr2) as the electrical offset at the timing to be described later. Vr2 is also a predefined value. When Vr2=0, for example, Vo2 itself can be detected as the electrical offset. The interval between the leading edge of the second blocking signal pulse and that of the second pulse of the detection control signal is defined so as to include the settling time of the output signal of the low pass filter 109, and is as long as the interval between the leading edge of the first blocking signal pulse and that of the first pulse of the detection control signal.

After the output signal value of the low pass filter 109 has settled, the detection control signal rises to the high level again and the offset detector 112 detects the electrical offset value. The detected value is stored in the detected value memory 113. The width of the second pulse of the detection control signal is defined so as to be long enough for the offset detector 112 to detect the electrical offset value, and is equal to the width of the first pulse thereof.

When the electrical offset is detected successfully, the detection control signal, first blocking signal and second blocking signal all go low, the first blocker 100 switches its output signal into the light quantity signal supplied from the light quantity detector 6, and the second blocker 102 switches its output signal into the signal supplied from the amplifier 101. Then, the output signal value of the low pass filter 109 recovers its original value as defined by the light quantity signal. The recovery time depends on the higher cutoff frequency of the low pass filter 109. The interval between the trailing edges of the first and second blocking signal pulses and that of the detection signal pulse is defined so as to include this recovery time.

When the output signal of the low pass filter 109 recovers that value defined by the light quantity signal, the detection signal becomes low and the cutoff frequency of the low pass filter 109 switches into the lower one. In addition, the hold signal also becomes low and the level of the tracking control signal is not held anymore. As a result, the laser beam spot is adjusted in the radial direction of the disc 1 so as to follow the center of the target track on the disc 1. In this manner, the electrical offset is detected.

Referring back to FIG. 7, in Step S104, the correction value calculator 114 derives the electrical offset value at the actual temperature by performing a linear calculation on the past temperature values stored in the temperature memory 106 and on the past electrical offset values stored in the detected value memory 113.

Finally, in Step S105, the correction value is updated using the electrical offset value that has been detected in Step S103 or the electrical offset value that has been derived in Step S104. Thereafter, the processing goes back to Step S100 again.

The optical disc drive 19 of the first preferred embodiment described above updates the correction value either by detecting the electrical offset with the tracking control operation once suspended or by deriving the electrical offset without suspending the tracking control operation at all, thereby correcting the electrical offset with the newly updated correction value. As a result, information can be transferred at a sufficiently high rate from the optical disc drive 19 to the buffer memory, or vice versa, with the read and/or write operation of the optical disc drive 19 suspended much less frequently.

In addition, when the electrical offset should be detected, the cutoff frequency of the low pass filter 109 is switched into a higher one, and the signal can be settled in a shorter amount of time. Thus, the interval to suspend the tracking control operation can also be shortened. As a result, when the tracking control operation is restarted, the beam spot can find its original track just as intended without causing any tracking error and the offset can be corrected in just a short time.

The correction value is updated according to the variation in the temperature of the circuit. Thus, the electrical offset can be corrected highly precisely in accordance with the temperature variation. Particularly when the actual electrical offset value is calculated using the temperature and electrical offset values that were detected in the past, those temperature and electrical offset values are most recently detected ones. Consequently, the electrical offset can be corrected highly precisely.

Furthermore, if the electrical offset is not detected until at least a predetermined amount of time has passed since the electrical offset was detected last time, then the transfer rate of the optical disc drive 19 (e.g., the transfer rate between the optical disc drive 19 and the buffer memory) cannot be too low to interfere with the data read and/or write operation.

The optical disc drive 19 either detects the electrical offset of a series of electric circuits that make up a signal path in the drive or derives the actual electrical offset value based on the previously detected temperature and electrical offset values of that series of circuits without detecting the electrical offset thereof. Accordingly, even if the respective sections of one electric circuit have mutually different temperatures, the electrical offset values of the respective sections can be calculated and corrected highly precisely. More specifically, as soon as the quantity of light received has been detected, the voltage of the resultant read signal is switched into the reference voltage and external inputs to the electric circuits are blocked. Thus, only the electrical offset of circuits that are engaged in processing the light quantity signal can be corrected selectively. According to this correcting technique, the processing of other signal systems is not affected seriously. Also, since the servo signal is held, the servo control operation can be resumed quickly once the electrical offset has been detected. As a result, the optical disc drive 19 has to suspend the data reading or writing operation for a shorter time, and information can be transferred at a sufficiently high rate between the optical disc drive 19 and the buffer memory.

In the preferred embodiment described above, the electrical offset of a series of electric circuits, which make up a signal path leading from the input terminal to the output terminal of the amplifier 101, and-that of another series of electric circuits, which make up a subdivided signal path leading from the input terminal of the TE signal generator 103 to the output terminal of the low pass filter 109, are corrected. Alternatively, the signal path may be subdivided more finely and the electrical offsets of the electric circuits belonging to those subdivisions may be corrected. Then, even more precise correction is realized. As another alternative, the second blocker 102 may be omitted and only the electrical offset of a series of electric circuits that make up the signal path leading from the input terminal of the amplifier 101 to the output terminal of the low pass filter 109 may be corrected. Then, the number of required circuits can be reduced and the electrical offset can be detected in a shorter time. Furthermore, the electrical offset may also be detected by selecting a signal path that makes a detour around the low pass filter 109. Then, the settling time can be further shortened and the tracking operation can be resumed even more quickly and accurately.

Embodiment 2

Figure 8:
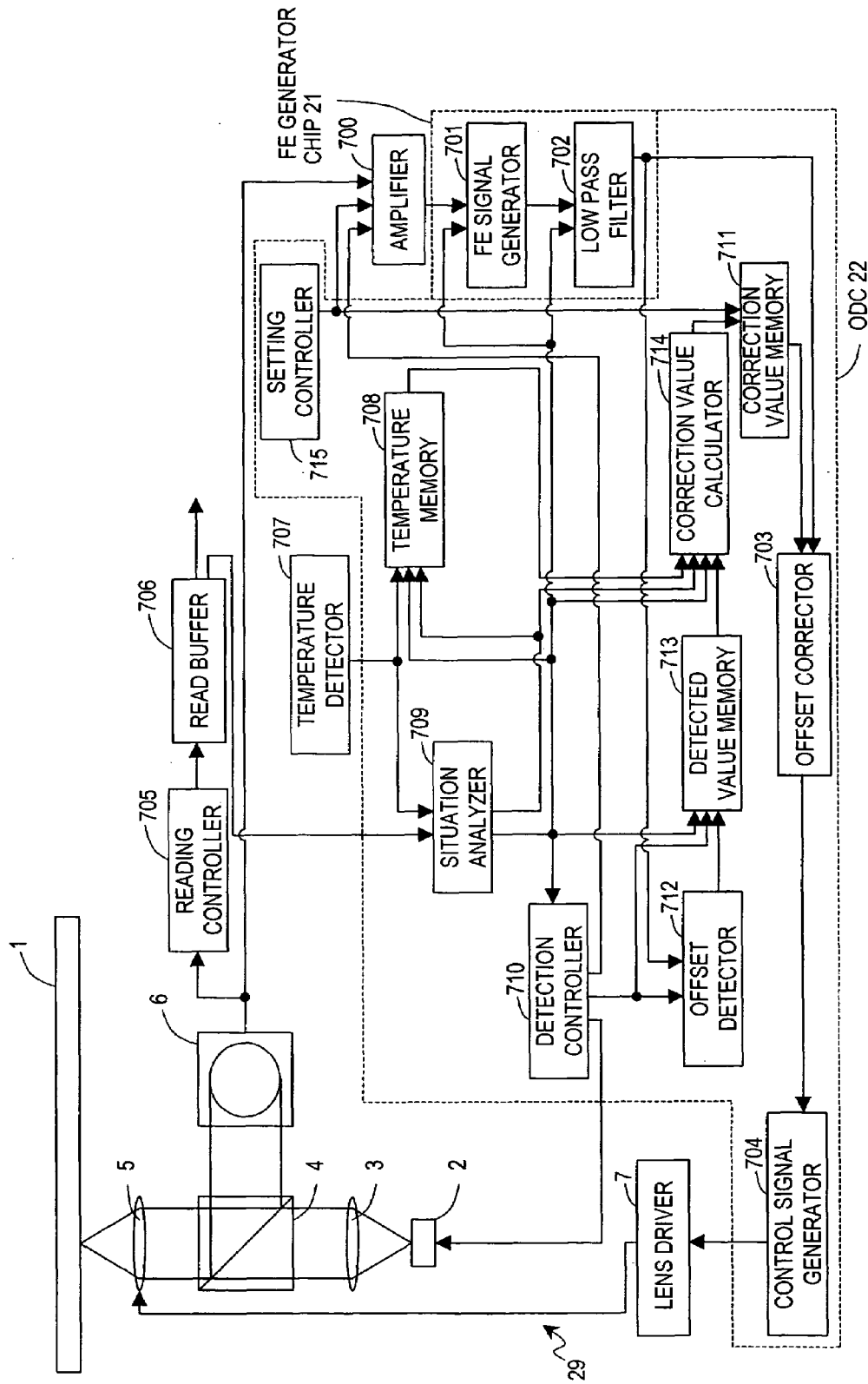
FIG. 8 is a block diagram of an optical disc drive 29 according to a second specific preferred embodiment of the present invention.

FIG. 8 shows an exemplary arrangement of functional blocks for an optical disc drive 29 according to a second specific preferred embodiment of the present invention. The application of the optical disc drive 29 is the same as the optical disc drive 19 of the first preferred embodiment described above.

The optical disc drive 29 preferably includes a lens driver 7, an optical head, a temperature detector 707, a reading controller 705, a read buffer 706, an FE generator chip 21 and an optical disc controller (ODC) 22. The reference numeral of the optical head is omitted to make this drawing simple enough to understand easily.

Hereinafter, the respective functional blocks will be described one by one. It should be noted that the description of some of these components with the same functions as the counterparts of the optical disc drive 19 of the first preferred embodiment shown in FIG. 1 will be omitted herein.

In accordance with a focus control signal supplied from the control signal generator 704, the lens driver 7 moves the objective lens 5 perpendicularly to the data storage layer of the optical disc 1. It should be noted that the lens driver 7 actually can change the position of the objective lens 5 not just perpendicularly to the data storage layer of the optical disc 1 but also along the radius of the optical disc 1. However, the latter control operation (i.e., a tracking control operation) is not the key to this preferred embodiment and the description thereof will be omitted herein.

The optical head of this second preferred embodiment is provided with an amplifier 700 in place of the first blocker 100 and amplifier 101 of the optical head 10 shown in FIG. 1. If the blocking signal supplied from the detection controller 710 is low, the laser diode 2 emits a laser beam. On the other hand, when the blocking signal goes high, the laser diode 2 stops emitting the laser beam. In the arrangement shown in FIG. 8, the laser diode 2 receives the blocking signal directly from the detection controller 710. Alternatively, as in the laser driver 1305 shown in FIG. 15 (to be described later), the actual supplied to the laser diode 2 may be controlled responsive to the blocking signal. More specifically, in that case, if the blocking signal is low, the laser driver supplies the laser diode 2 with such an amount of current as to allow the laser diode 2 to emit the laser beam. On the other hand, if the blocking signal is high, then the laser driver operates not to supply the laser diode 2 with any current to stop emitting the laser beam. As another alternative, the blocking signal may also be generated by a control signal generator 704 to be described later.

The amplifier 700 switches the amplification factor from one of two values into the other. One of the two values is associated with laser power during a write operation while the other value is associated with laser power during a read operation. In response to a setting signal supplied from a setting controller 715 (to be described later) and an amplification control signal supplied from the detection controller 710, the amplifier 700 switches the amplification factors for the light quantity signals, thereby keeping the amplitude of the FE signal substantially constant even if the laser power changes in the read operation and the write operation. The amplification control signal has three levels consisting of high, central and low levels. If the amplification control signal is at the central level, the amplifier 700 sets the amplification factor in accordance with the setting signal. On the other hand, if the amplification control signal is high or low, then the amplifier 700 sets the amplification factor in accordance with the amplification control signal. More specifically, if the setting signal is high, the amplifier 700 switches the amplification factor into one for writing. On the other hand, if the setting signal is low, then the amplifier 700 switches the amplification factor into one for reading. By operating the amplifier 700 adaptively in this manner, even if the light quantity signal supplied from the light quantity detector 6 is variable within two or more ranges, the signal to be supplied to the FE signal generator 701 can still have a fixed variation range.

In response to the light quantity signal, the reading controller 705 reads out the data from the optical disc 1 and outputs it to the read buffer 706.

The read buffer 706 stores the data that has been read out by the reading controller 705. Those data stored will make up at least one group of information. The host computer (not shown) reads out the information stored in the read buffer 706 and then performs read processing on it. A read information amount signal represents the amount of information stored in the read buffer 706.

The temperature detector 707 detects the internal temperature of the optical disc drive 29, thereby outputting a temperature signal.

In the FE generator chip 21, the FE signal generator 701 detects how much the focal point of the laser beam has shifted from the data storage layer of the optical disc 1 based on the output signal of the amplifier 700, thereby generating and outputting a focus error (FE) signal.

The low pass filter 702 filters out excessive frequency components, which exceed a highest frequency required for a focus control operation, from the output FE signal of the FE signal generator 701, thereby extracting frequency components that are equal to, or lower than, the highest frequency (i.e., the cutoff frequency). Also, if the output detection signal of a situation analyzer 709 is high, then the low pass filter 702 increases the cutoff frequency. On the other hand, if the output detection signal is low, then the low pass filter 702 decreases the cutoff frequency.

Next, the respective components of the ODC 22 will be described.

The offset corrector 703 subtracts the output signal value of the correction value memory 711 from the output signal value of the low pass filter 702 and outputs the remainder.

If the detection signal is low, the control signal generator 704 outputs a focus control signal in response to the output signal of the offset corrector 703. The focus control signal is used to focus the laser beam right on the data storage layer of the optical disc 1. On the other hand, if the detection signal is high, the control signal generator 704 fixes the value of the focus control signal.

In response to the detection signal and update signal, the temperature memory 708 stores the values of the temperature signal thereon.

In accordance with the temperature signal and the value stored in the temperature memory 708, the situation analyzer 709 outputs a digital update signal. Also, in accordance with the value of the read information amount signal, the situation analyzer 709 outputs a digital detection signal.

The detection controller 710 outputs a blocking signal, an amplification control signal and a detection control signal as respective digital signals in response to the detection signal.

The setting controller 715 outputs a digital setting signal, which is high during a write operation and low during a read operation, respectively.

The amplifier 700 amplifies the light quantity signal, outputs the amplified light quantity signal, and changes the amplification factors in accordance with the setting signal and amplification control signal.

On receiving a high-level detection control signal, the offset detector 712 detects the electrical offset in the output signal of the low pass filter 702, thereby outputting an offset signal.

The detected value memory 713 stores the value of the offset signal thereon in accordance with the detection control signal and detection signal.

In response to the update and detection signals, the correction value calculator 714 reads out the values stored in the detected value memory 713 and temperature memory 708, calculates a correction value for the electrical offset and then outputs a correction signal.

The correction value memory 711 stores or outputs the value of the correction signal. Also, in response to the setting signal supplied from the setting controller 715, the correction value memory 711 switches the values to be output.

The temperature memory 708 has three information storage areas to store the values of the temperature signals supplied from the temperature detector 707. These information storage areas will be specified herein by addresses Nos. 1, 2 and 3, respectively. The value stored in the area specified by address No. 1 is modified in response to the update signal supplied from the situation analyzer 709. On the other hand, the values stored in the areas specified by addresses Nos. 2 and 3 are modified in response to the detection signal supplied from the situation analyzer 709.

Figure 9:
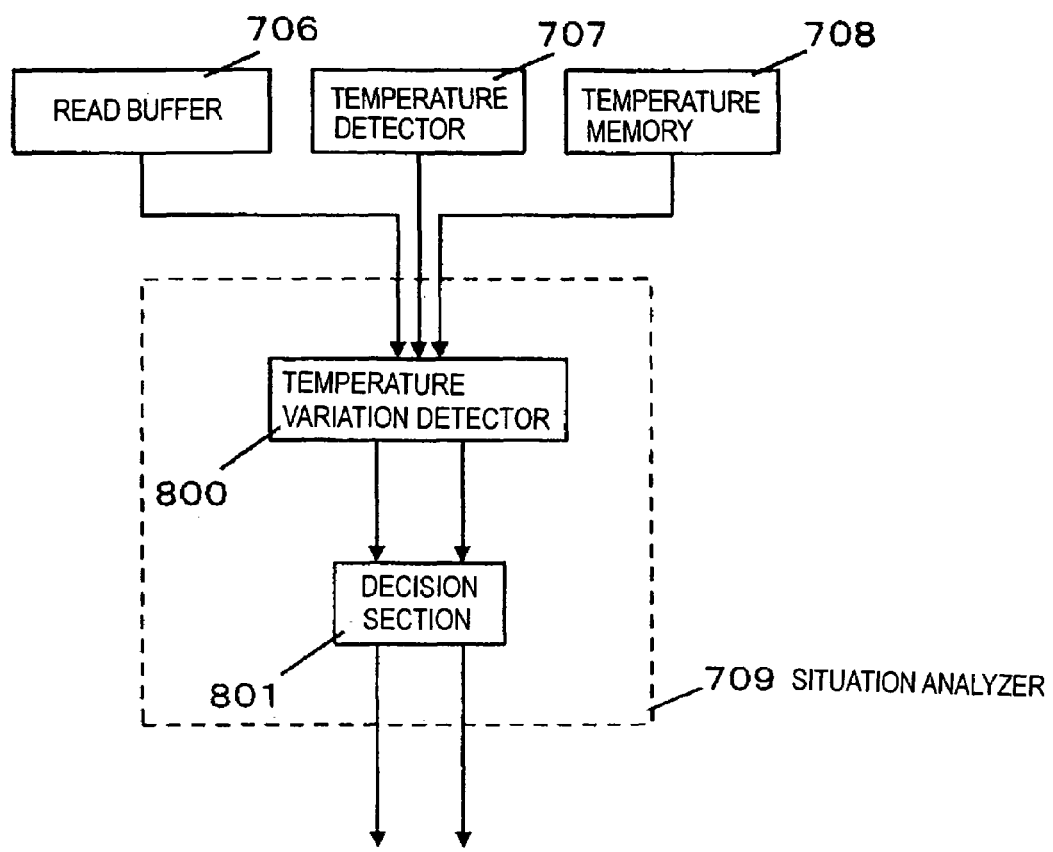
FIG. 9 is a block diagram of the situation analyzer 709 shown in FIG. 8.

Next, the situation analyzer 709 will be described in further detail with reference to FIG. 9. FIG. 9 shows an exemplary arrangement of functional blocks for the situation analyzer 709. The situation analyzer 709 preferably includes a temperature variation detector 800 and a decision section 801. The temperature variation detector 800 reads out the stored value from the temperature memory 708 and calculates the difference between the temperature signal value supplied from the temperature detector 707 and the value stored in the area specified by address No. 1 in the temperature memory 708, thereby outputting a temperature variation signal representing the absolute value of the difference. The decision section 801 outputs a digital update signal in response to the temperature variation signal supplied from the temperature variation detector 800 and also outputs a digital detection signal in response to the update signal and the read information amount signal supplied from the read buffer 706.

Next, the update signal and detection signal to be output from the situation analyzer 709 will be described in detail with reference to FIG. 10. It will also be described how the respective components of the temperature memory 708 and situation analyzer 709 operate.

Figure 10:
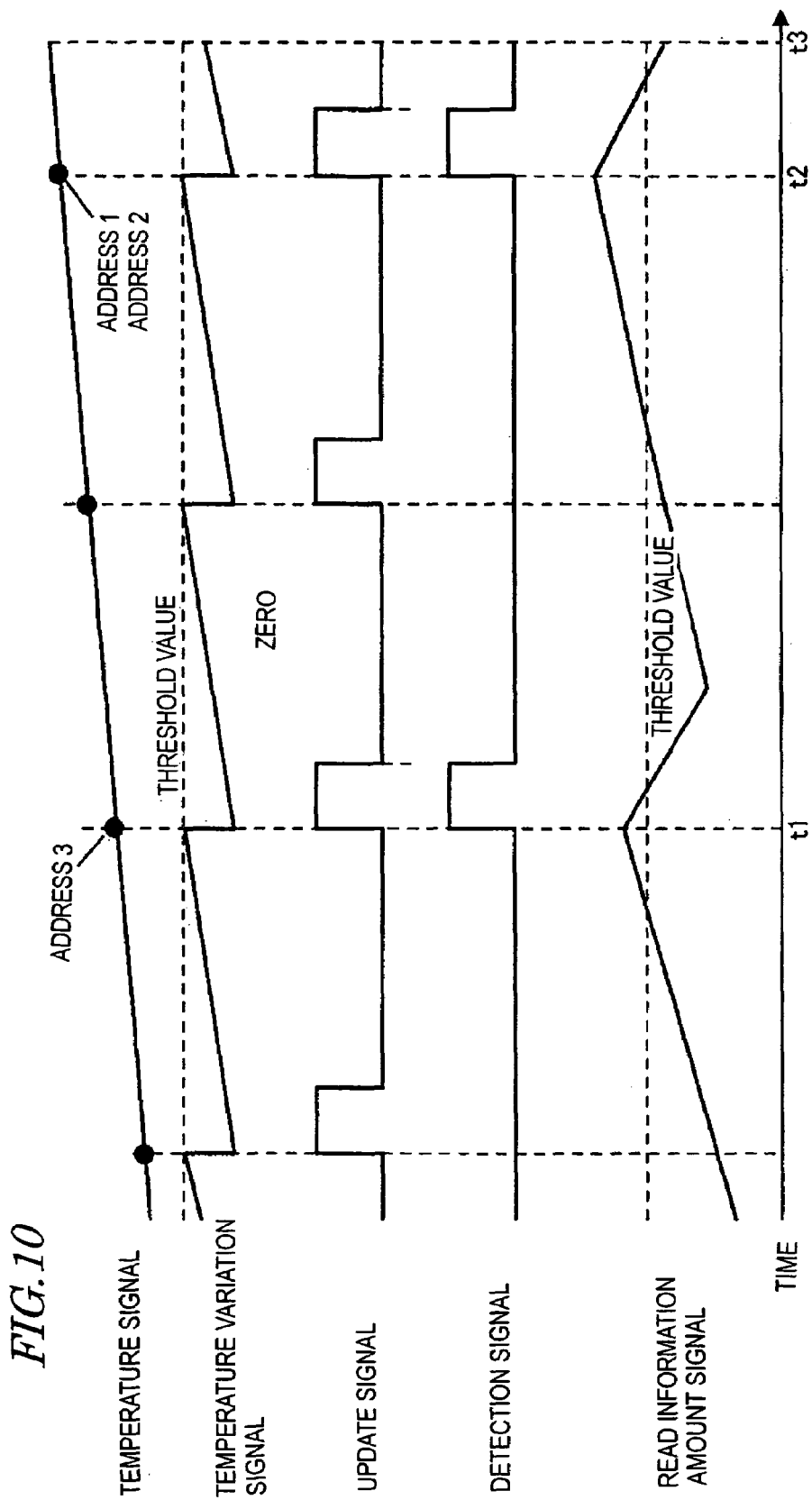
FIG. 10 is a timing diagram showing the waveforms of signals that are associated with the situation analyzer 709.

FIG. 10 is a timing diagram showing the waveforms of signals that are associated with the situation analyzer 709. Once the value of the temperature variation signal exceeds a predetermined threshold value, the decision section 801 maintains the update signal at high level for a certain amount of time. The high-level update signal instructs that update should be done, while the low-level update signal instructs that the no update should be done.

The temperature memory 708 stores the temperature signal value on the leading edge of each update signal pulse in the area specified by address No. 1. In FIG. 10, the values to be stored are indicated by the solid circles ●. The temperature variation signal is obtained as the absolute value of the difference between a temperature signal value and the value stored in the area specified by address No. 1 in the temperature memory 708. When the update signal rises, the temperature signal value is equal to the value stored in the address No. 1 area. Thus, the temperature variation signal is zero.

The detection signal is the digital output signal of the decision section 801. If the value of the read information amount signal is equal to or greater than a predetermined threshold value on the leading edge of any update signal pulse, then the detection signal is maintained high for a certain amount of time. Otherwise, the detection signal goes low. It should be noted that the trailing edge of each detection signal pulse is synchronous with that of its associated update signal pulse. The high-level detection signal instructs that detection should be done, while the low-level detection signal instructs that the no detection should be done.

As shown in FIG. 10, when the variation in the internal temperature of the optical disc drive 29 reaches a predetermined threshold value for the first time since the last leading edge of the update signal, the update signal is maintained high for a certain amount of time. Also, if the amount of information stored in the read buffer 706 has reached a predetermined value at that time, then the detection signal is also maintained high for a certain amount of time.

When the detection signal rises to the high level, the temperature memory 708 transfers the value that has been stored in the address No. 2 area to the address No. 3 area and then stores the temperature signal value in the address No. 2 area instead.

For example, look at the times t1, t2 and t3 shown in FIG. 10. Supposing the time t3 is the present time, the time t2 is synchronous with the leading edge of the last pulse of the detection signal, and the time t1 is synchronous with the leading edge of the second last pulse of the detection signal.

In the areas specified by addresses Nos. 1 and 2 in the temperature memory 708, the value of the temperature signal at the time t2 is stored. The value of the temperature signal at the time t1 is stored in the area specified by address No. 3. That is to say, in the area specified by address No. 1, the value of the temperature signal when the update signal rose last time is stored irrespective of the value of the detection signal. In the area specified by address No. 2, the value of the temperature signal when the update and detection signals both rose last time is stored. And in the area specified by address No. 3, the value of the temperature signal when the update and detection signals both rose second last time is stored.

Figure 11:
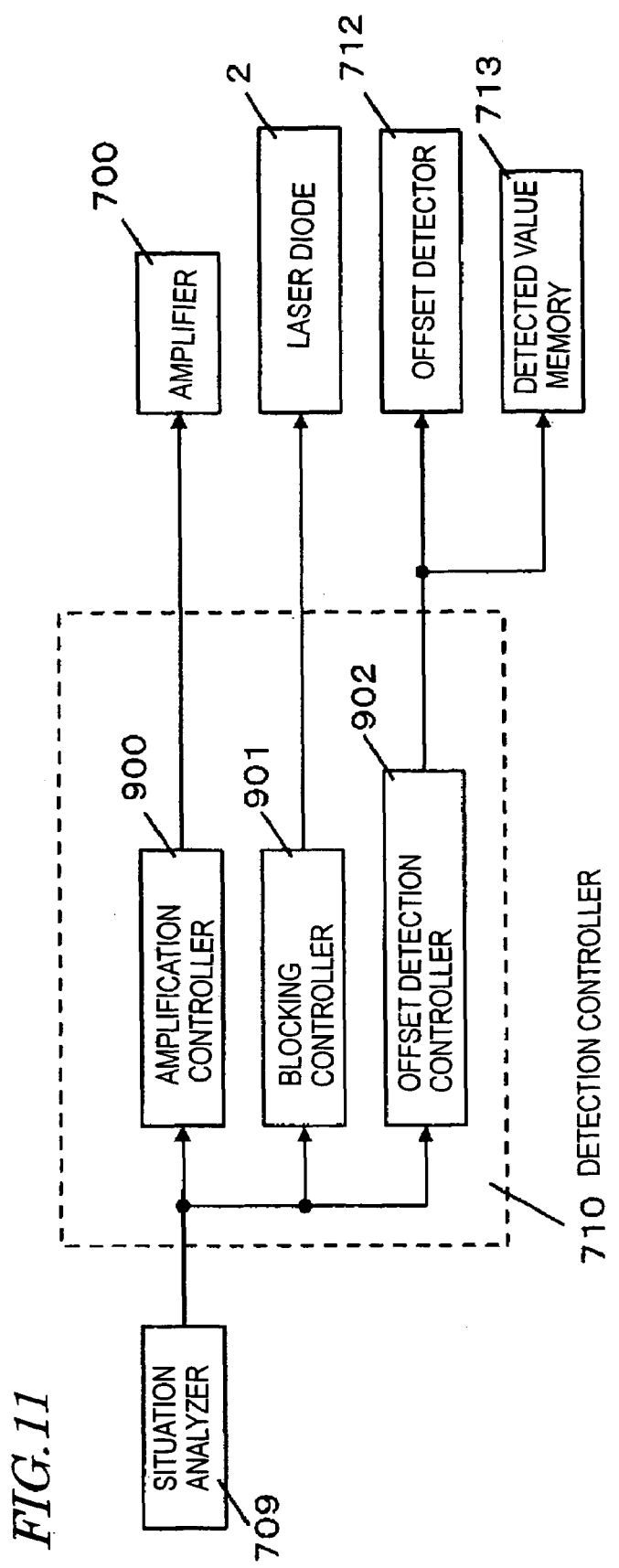
FIG. 11 is a block diagram of the detection controller 710 shown in FIG. 8.

Hereinafter, the detection controller 710 will be described in detail. FIG. 11 shows an exemplary arrangement of functional blocks for the detection controller 710. The detection controller 710 preferably includes an amplification controller 900, a blocking controller 901 and an offset detection controller 902. Based on the amount of time that has passed since the detection signal supplied from the situation analyzer 709 rose last time, the amplification controller 900 generates a three-value amplification control signal and outputs it to the amplifier 700. The blocking controller 901 generates a blocking signal and outputs it to the laser diode 2. The offset detection controller 902 generates a detection control signal and outputs it to the offset detector 712 and detected value memory 713.

Figure 12:
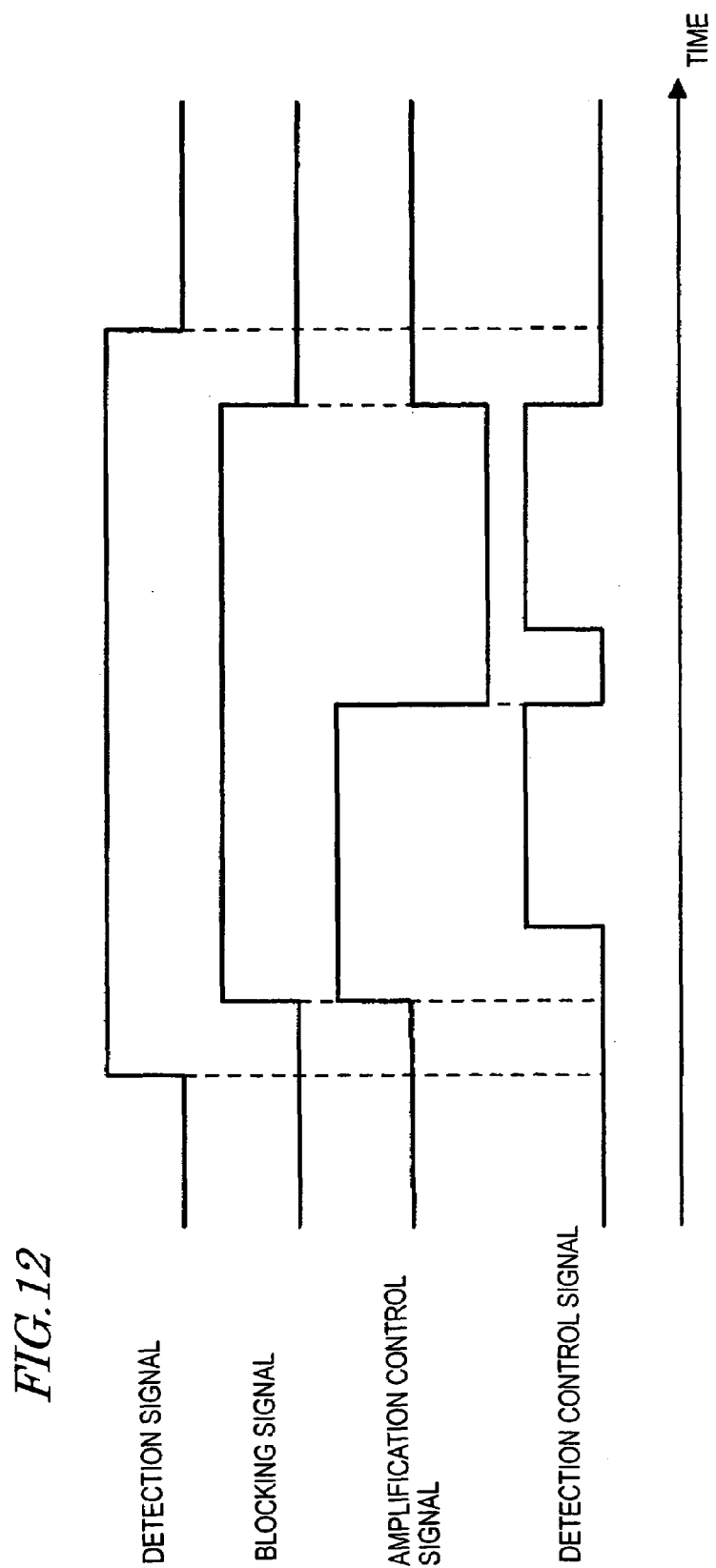
FIG. 12 is a timing diagram showing the waveforms of signals that are associated with the detection controller 710.

These signals will be described in detail below with reference to FIG. 12. FIG. 12 is a timing diagram showing the waveforms of those signals that are associated with the detection controller 710. The leading edge of the blocking signal is behind that of its associated detection signal pulse, and the trailing edge thereof is ahead of that of the detection signal pulse. While the blocking signal is high, the amplification control signal includes a single positive pulse and a single negative pulse. The leading edge of the positive pulse is synchronous with that of its associated blocking signal pulse. The trailing edge of the positive pulse is synchronous with that of the negative pulse. And the leading edge of the negative pulse is synchronous with the trailing edge of the blocking signal pulse. While the blocking signal is high, two pulses of the detection control signal are generated. The leading edge of the first pulse is behind that of its associated blocking signal pulse while the trailing edge of the first pulse is synchronous with the trailing edges of the positive and negative pulses of the amplification control signal. The leading edge of the second pulse is behind the trailing edges of the positive and negative pulses of the amplification control signal while the trailing edge of the second pulse is synchronous with that of its associated blocking signal pulse.

Next, the offset detector 712 will be described. On receiving a high-level detection control signal from the detection controller 710, the offset detector 712 detects the output signal value of the low pass filter 702. As will be described later, the output signal value of the low pass filter 702 during the first pulse of the detection control signal is equal to the electrical offset that is produced in the circuit section ranging from the input terminal of the amplifier 700, of which the amplification factor has been switched for data writing, to the output terminal of the low pass filter 702. On the other hand, the output signal value of the low pass filter 702 during the second pulse of the detection control signal is equal to the electrical offset that is produced in the circuit section ranging from the input terminal of the amplifier 700, of which the amplification factor has been switched for data reading, to the output terminal of the low pass filter 702. The offset detector 712 is provided to detect these electrical offsets.

Hereinafter, the detected value memory 713 will be described in detail. The detected value memory 713 has four information storage areas, which will be specified herein by addresses Nos. 7, 8, 9 and 10, respectively. The detected value memory 713 counts the respective pulses of the detection control signal to find how many pulses have been generated since the leading edge of its associated detection signal pulse. And on the trailing edge of each detection control signal pulse supplied from the detection controller 710, the detected value memory 713 stores the output offset signal value of the offset detector 712. If the pulse of the detection control signal is a pulse that has been generated for the first time since the detection signal rose, then the detected value memory 713 stores the value of the offset signal, associated with the trailing edge thereof, in the information storage area specified by address No. 7. If the detection control signal pulse is a pulse generated for the second time, then the detected value memory 713 stores the value of the offset signal, associated with the trailing edge thereof, in the information storage area specified by address No. 8. As a result of these operations, the electrical offset value at the amplification factor for data writing is stored in the area specified by address No. 7, while the electrical offset value at the amplification factor for data reading is stored in the area specified by address No. 8.

Also, the detected value memory 713 transfers the value that has been stored at address No. 7 to address No. 9 and the value that has been stored at address No. 8 to address No. 10, respectively, on the leading edge of the detection signal pulse.

As a result of these operations, the electrical offset values at the amplification factors for writing and reading, which were updated and detected last time, are stored at addresses Nos. 7 and 8 in the detected value memory 713, while the electrical offset values at the amplification factors for writing and reading, which were updated and detected second last time, are stored at addresses Nos. 9 and 10 in the detected value memory 713.

Next, the correction value calculator 714 will be described in detail.

Figure 13:
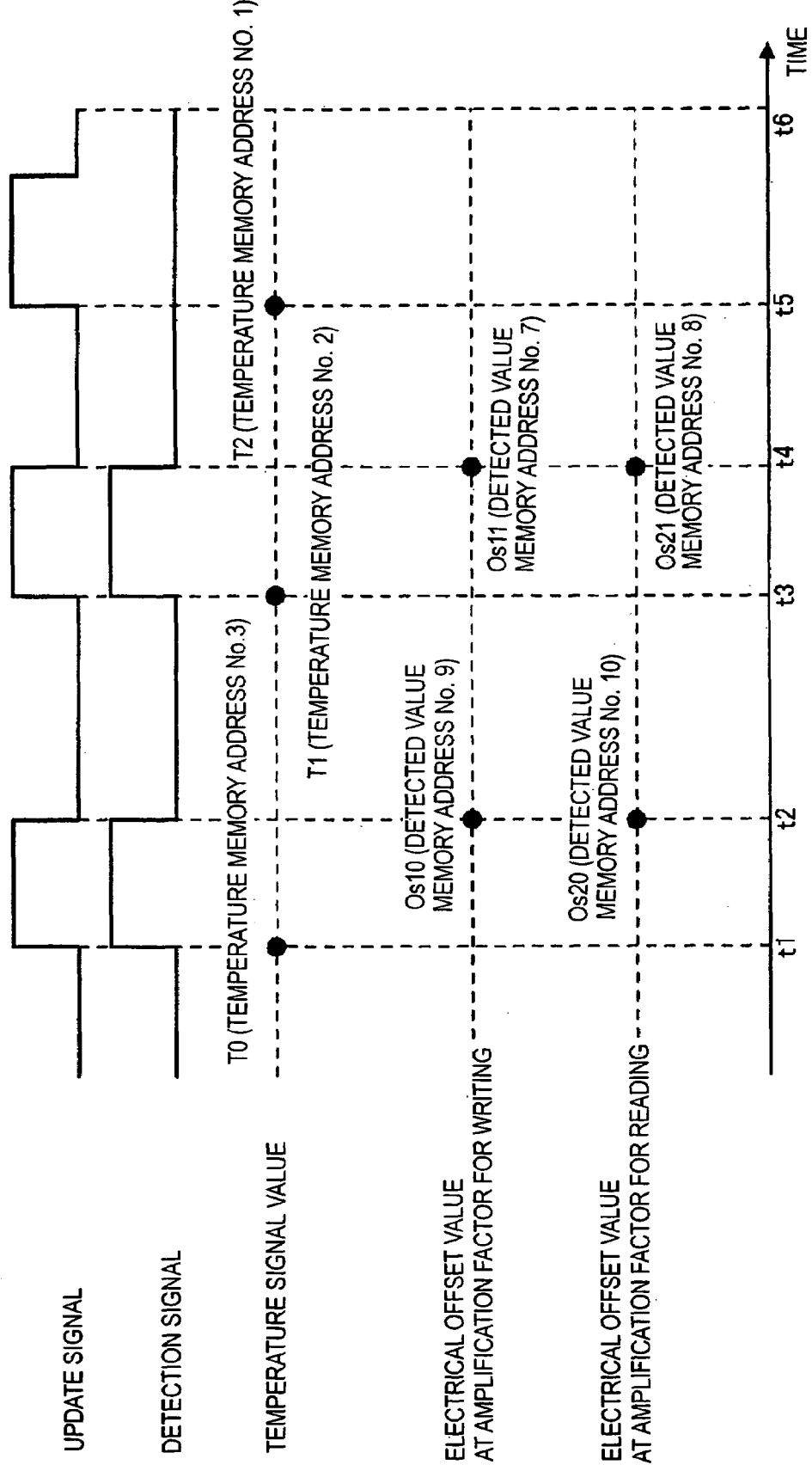
FIG. 13 shows how the values stored on the temperature memory 708 and detected value memory 713 shown in FIG. 8 change with the detection signal and update signal.

FIG. 13 shows a relationship between the values stored in the temperature memory 708 and detected value memory 713 and the detection and update signals. To calculate the correction value, the correction value calculator 714 needs the value of the temperature signal, the value of the electrical offset at the amplification factor for writing, and the value of the electrical offset at the amplification factor for reading.

Suppose t6 is the present time. In that case, the leading edge of the last detection signal pulse is synchronous with the time t3, while the leading edge of the second last detection signal pulse is synchronous with the time t1. Also, the trailing edge of the last detection signal pulse is synchronous with the time t4, while the trailing edge of the second last detection signal pulse is synchronous with the time t2. Furthermore, the leading edge of the last update signal pulse is synchronous with the time t5.

In the area specified by address No. 3 in the temperature memory 708, the value T0 of the temperature signal at the time t1 is stored. The value T1 of the temperature signal at the time t3 is stored in the area specified by address No. 2. And the value T2 of the temperature signal at the time t5 is stored in the area specified by address No. 1.

In the area specified by address No. 9 in the detected value memory 713, the value Os10 of the electrical offset associated with the amplification factor for writing around the time t2 is stored. On the other hand, the value Os11 of the electrical offset associated with the amplification factor for writing around the time t4 is stored in the area specified by address No. 7 in the detected value memory 713.

In the area specified by address No. 10 in the detected value memory 713, the value Os20 of the electrical offset associated with the amplification factor for reading around the time t2 is stored. On the other hand, the value Os21 of the electrical offset associated with the amplification factor for reading around the time t4 is stored in the area specified by address No. 8 in the detected value memory 713.

Next, it will be described how the correction value calculator 714 calculates the correction value.

The correction value calculator 714 separately calculates a correction value for the electrical offset associated with the amplification factor for writing and a correction value for the electrical offset associated with the amplification factor for reading. After the detection and update signals supplied from the situation analyzer 709 have fallen, the correction value calculator 714 calculates the correction values.

Suppose the correction value newly calculated for the amplification factor for writing is identified by C1, while the correction value newly calculated for the amplification factor for reading is identified by C2.

First, if the update and detection signals are both high, then the correction value C1 is Os11 and the correction value C2 is Os21. That is to say, the actual electrical offset has already been detected by the offset detector 112 and the correction value calculator 714 uses the detected electrical offset value as the correction value as it is.

On the other hand, if the update signal is high while the detection signal is low, then the correction value calculator 714 calculates the correction value C1 by the following Equation (3) and the correction value C2 by the following Equation (4), respectively:

$$C1=(Os11-Os10)\times(T12-T11)/(T11-T10)+Os11 \quad (3)$$

$$C2=(Os21-Os20)\times(T22-T21)/(T21-T20)+Os21 \quad (4)$$

At this time, no actual electrical offset is detected, and therefore, the correction value calculator 714 estimates the actual electrical offset value from its past values and uses the estimated value as the correction value. Specifically, the correction value calculator 714 calculates the estimated electrical offset value based on the electrical offset values that were detected last time and second last time and the temperatures at the times of detection on the supposition that the electrical offset changes linearly with the temperature.

The correction value calculator 714 outputs the calculated correction values as two separate correction signals for the two situations where the amplification factor of the amplifier 700 has been switched into a factor for writing and a factor for reading, respectively. In the same way, the correction value memory 711 also stores the two correction signal values separately.

Figure 14:
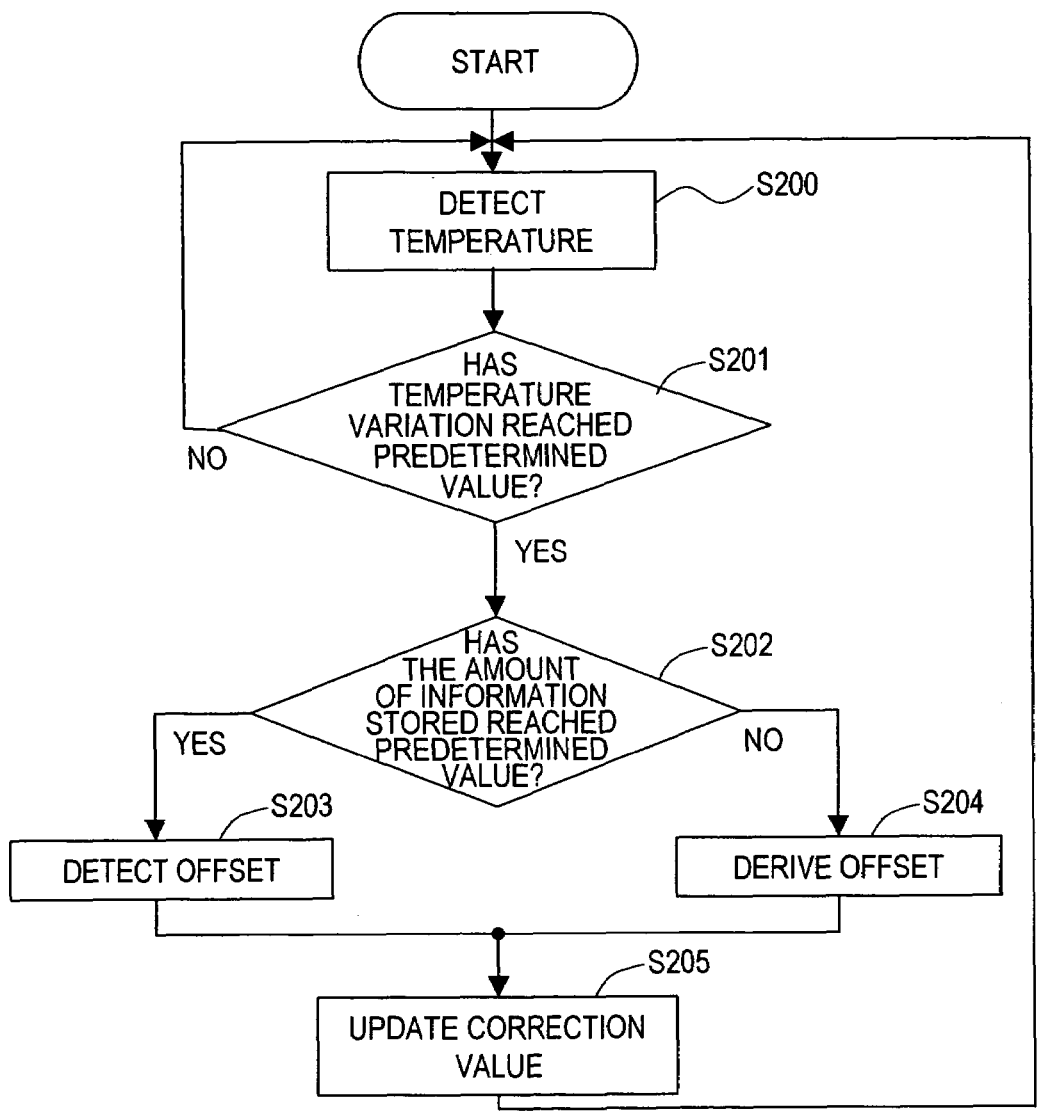
FIG. 14 is a flowchart showing how the optical disc drive 29 operates.

Hereinafter, it will be described with reference to FIG. 14 exactly how the optical disc drive 29 of this second preferred embodiment operates. FIG. 14 shows an exemplary procedure in which the optical disc drive 29 operates.

First, in Step S200, the temperature detector 707 detects the internal temperature of the optical disc drive. Next, in Step S201, the situation analyzer 709 determines whether or not the internal temperature of the optical disc drive has changed by a predetermined value or more since the offset correction value was updated last time. If the answer is NO, the processing goes back to the previous step S200. On the other hand, if the answer is YES, the processing advances to the next step S202. In that next step S202, the situation analyzer 709 determines whether or not at least a predetermined amount of information is stored in the read buffer 706. If the answer is YES, then the processing advances to Step S203. Otherwise, the processing advances to Step S204.

In Step S203, the offset detector 712 detects the offset. Hereinafter, the offset detection process will be described in detail with reference to FIGS. 8 and 12. First, when the situation analyzer 709 generates the detection signal (i.e., when the detection signal rises to the high level), the control signal generator 704 holds the previous or current value of the focus control signal. While the value of the focus control signal is being held in this manner, the lens driver 7 outputs a drive signal instructing that the objective lens 5 be fixed. Once the objective lens 5 is fixed at a position with respect to the optical disc 1, the laser beam spot is also fixed at a position that is defined perpendicularly to the data storage layer of the optical disc 1 where the beam spot has been until the focus control signal value is held.

When the detection signal rises to the high level, the low pass filter 702 switches its cutoff frequency into a higher value. In the interval between the leading edge of the detection signal pulse and that of the positive pulse of the amplification control signal of that of the blocking signal pulse, the control signal generator 704 holds the level of the focus control signal. It should be noted that this holding interval includes the time it takes to switch the cutoff frequencies of the low pass filter 702.

After the low pass filter 702 has switched the cutoff frequencies, the detection controller 710 generates the amplification control signal (i.e., the amplification control signal rises to the high level). In response, the amplifier 700 switches its amplification factor into one for data writing. Also, the detection controller 710 generates the blocking signal to make the laser diode 2 stop emitting the laser beam. At this point in time, the output signal value of the low pass filter 702 represents the value of the electrical offset that is associated with the amplification factor for writing. The electrical offset is detected under the same principle as that already described for the first preferred embodiment.

It should be noted that the time it takes for the output signal of the low pass filter 702 to settle at the electrical offset value depends on the higher cutoff frequency of the low pass filter 702. The interval between the leading edge of the positive pulse of the amplification control signal or that of the blocking signal pulse and that of the first pulse of the detection control signal is defined so as to include this settling time.

After the output signal value of the low pass filter 702 has settled at the electrical offset value, the detection control signal rises to the high level and the offset detector 712 detects the electrical offset value. The detected value is stored in the detected value memory 713. The width of the first pulse of the detection control signal is defined so as to be long enough for the offset detector 712 to detect the electrical offset value.

When the electrical offset is detected successfully, the amplification control signal falls to the low level. In response, the amplifier 700 switches its amplification factor into one for data reading. At this point in time, the output signal value of the low pass filter 702 represents the value of the electrical offset that is associated with the amplification factor for reading. This electrical offset is also detected as already described for the first preferred embodiment. The interval between the trailing edge of the negative pulse of the amplification control signal and leading edge of the second pulse of the detection control signal is defined so as to include the settling time of the output signal of the low pass filter 702, and is as long as the interval between the leading edge of the positive pulse of the amplification control signal or that of the blocking signal pulse and that of the first pulse of the detection control signal.

After the output signal value of the low pass filter 702 has settled, the detection control signal rises to the high level again and the offset detector 712 detects the electrical offset value. The width of the second pulse of the detection control signal is defined so as to be long enough for the offset detector 712 to detect the electrical offset value, and is equal to the width of the first pulse thereof.

When the electrical offset is detected successfully, the detection control signal and blocking signal both go low and the laser diode 2 starts emitting the laser beam again. At the same time, the level of the amplification control signal rises to the central level. Then, the output signal value of the low pass filter 702 recovers its original value as defined by the light quantity signal. The recovery time depends on the higher cutoff frequency of the low pass filter 702. The interval between the trailing edge of the blocking signal pulse, the trailing edge of the second pulse of the detection control signal or the leading edge of the negative pulse of the amplification control signal and the trailing edge of the detection signal pulse is defined so as to include this recovery time.

When the output signal of the low pass filter 702 recovers that value defined by the light quantity signal, the detection signal becomes low and the cutoff frequency of the low pass filter 702 switches into the lower one. In addition, the hold signal also becomes low and the level of the focus control signal is not held anymore. As a result, the focal point of the laser beam is adjusted perpendicularly to the data storage layer of the optical disc 1 so as to be located right on the data storage layer. In this manner, the electrical offset is detected.

Referring back to FIG. 14, in Step S204, the correction value calculator 714 derives the electrical offset value at the actual temperature by performing a linear calculation on the past temperature values stored in the temperature memory 708 and on the past electrical offset values stored in the detected value memory 713.

Finally, in Step S205, the correction value is updated using the electrical offset value that has been detected in Step S203 or the electrical offset value that has been derived in Step S204. Thereafter, the processing goes back to Step S200 again.

The optical disc drive 29 of the second preferred embodiment described above updates the correction value either by detecting the electrical offset with the focus control operation once suspended or by deriving the electrical offset without suspending the focus control operation at all, thereby correcting the electrical offset with the newly updated correction value. As a result, information can be transferred at a sufficiently high rate from the optical disc drive 29 to the buffer memory, or vice versa, with the read and/or write operation of the optical disc drive 29 suspended much less frequently.

In addition, in the second preferred embodiment described above, electrical offset correction values are separately calculated for a group of circuits for reading and for another group of circuits for writing, and one of these two correction values is selectively used for correction depending on whether the optical disc drive is used for reading or writing. As a result, high-precision correction is achieved.

Embodiment 3

Figure 15:
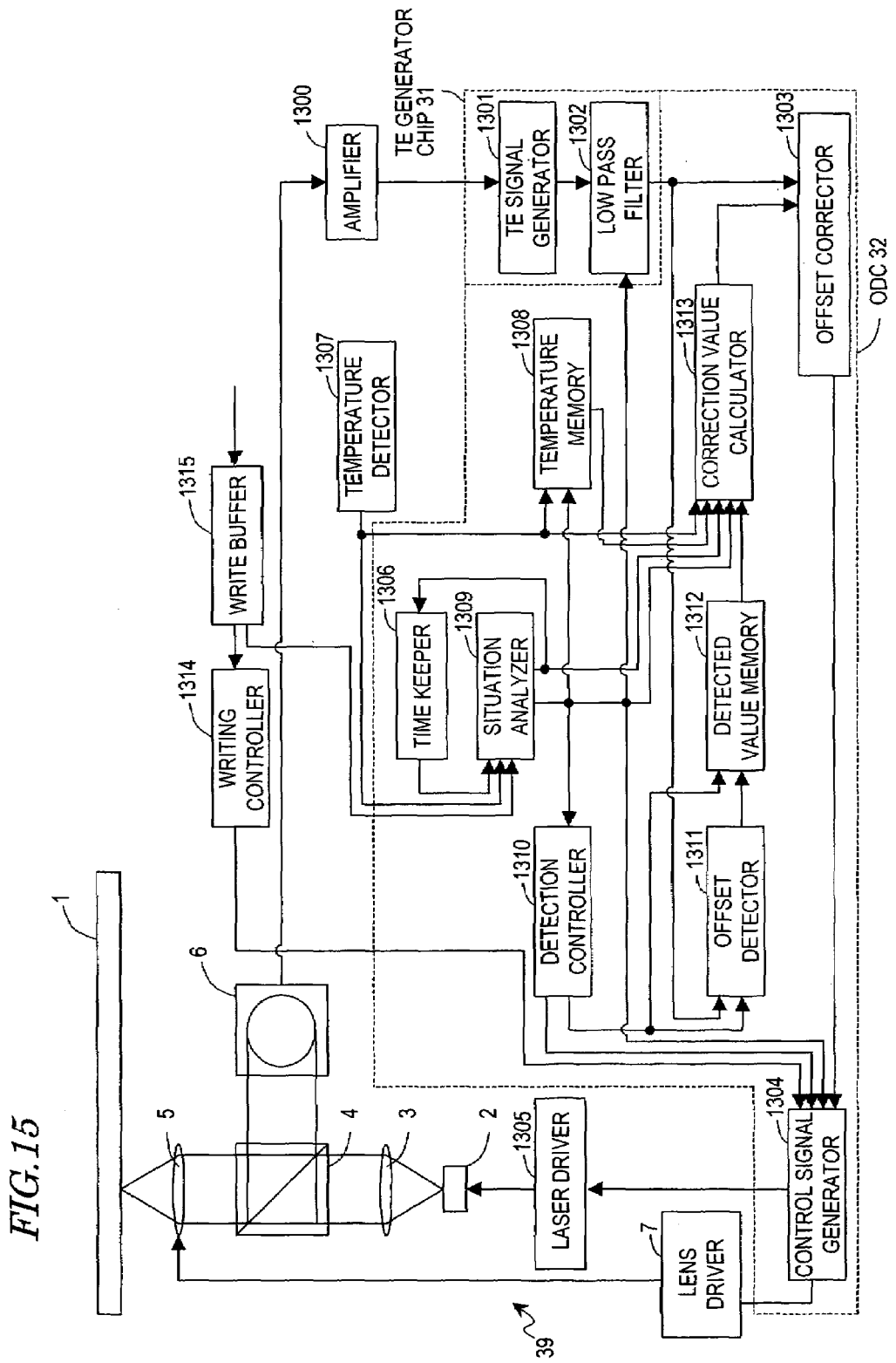
FIG. 15 is a block diagram of an optical disc drive 39 according to a third specific preferred embodiment of the present invention.

FIG. 15 shows an exemplary arrangement of functional blocks for an optical disc drive 39 according to a third specific preferred embodiment of the present invention. The application of the optical disc drive 39 is the same as the optical disc drive 19 of the first preferred embodiment described above.

The optical disc drive 39 preferably includes a lens driver 7, a laser driver 1305, an optical head, a temperature detector 1307, a writing controller 1314, a write buffer 1315, a TE generator chip 31 and an optical disc controller (ODC) 32. The reference numeral of the optical head is omitted to make this drawing simple enough to understand easily.

Hereinafter, the respective functional blocks will be described one by one. It should be noted that the description of some of these components with the same functions as the counterparts of the optical disc drive 19 of the first preferred embodiment shown in FIG. 1 will be omitted herein.

In accordance with a blocking signal and a write signal that are supplied from a control signal generator 1304, the laser driver 1305 outputs a laser power control signal (e.g., a current signal) for a predetermined amount of time. The timing and intensity of the laser power control signal are controlled in response to the blocking signal and write signal. If the blocking signal is high, the laser driver 1305 outputs a control signal instructing that the laser beam should stop being emitted.

The optical head includes an amplifier 1300 in place of the first blocker 100 and amplifier 101 of the optical head 10 shown in FIG. 1. In accordance with the output signal of the laser driver 1305, the laser diode 2 emits a laser beam. It should be noted that the detection controller 1310 may generate and output the blocking signal to control operations of the laser diode 2. The laser diode 2 may be controlled by the blocking signal to emit and stop emitting the laser beam.

The amplifier 1300 amplifies and outputs the light quantity signal supplied from the light quantity detector 6.

The write buffer 1315 obtains the data to be written on the optical disc 1 from a host computer (not shown) and stores the data thereon. A write information amount signal represents the amount of data stored on the write buffer 1315.

The writing controller 1314 reads out the data from the write buffer 1315, converts the data into a write instruction signal to be written on the optical disc 1 and then outputs the write instruction signal.

The temperature detector 1307 detects the internal temperature of the optical disc drive 39, thereby outputting a temperature signal.

In the TE generator chip 31, the TE signal generator 1301 detects the shift of the laser beam spot from the center of the target track on the optical disc 1 based on the output signal of the amplifier 1300, thereby generating and outputting a tracking error (TE) signal.

The low pass filter 1302 filters out excessive frequency components, which exceed a highest frequency required for a tracking control operation, from the output TE signal of the TE signal generator 1301, thereby extracting frequency components that are equal to, or lower than, the highest frequency (i.e., the cutoff frequency). Also, if the output detection signal of a situation analyzer 1309 is high, then the low pass filter 1302 increases the cutoff frequency. On the other hand, if the output detection signal is low, then the low pass filter 1302 decreases the cutoff frequency.

Hereinafter, the respective components of the ODC 32 will be described one by one.

The offset corrector 1303 subtracts the signal value of the correction signal supplied from the correction value calculator 1313 from the output signal value of the low pass filter 1302 and outputs the remainder.

If the detection signal is low, the control signal generator 1304 outputs a tracking control signal in response to the output signal of the offset corrector 1303. The tracking control signal is used to make the laser beam spot follow the target track on the optical disc 1. On the other hand, if the detection signal is high, the control signal generator 1304 fixes the value of the tracking control signal. The control signal generator 1304 receives a digital blocking control signal from detection controller 1310 and generates a digital blocking signal. Note that levels of the digital blocking signal are determined according to an operating characteristics of the laser driver 1305 which receives the blocking signal. It should be noted that each pulse of the blocking control signal and the blocking signal rises and falls at the same time.

The time keeper 1306 keeps time to figure out the amount of time that has passed since a digital update signal pulse, supplied from the situation analyzer 1309, fell last time, thereby outputting a timing signal.

On the trailing edge of a digital detection signal pulse supplied from the situation analyzer 1309, the temperature memory 1308 stores the output temperature signal value of the temperature detector 1307.

In response to the timing signal supplied from the time keeper 1306, the situation analyzer 1309 outputs the digital update signal. Also, in accordance with the write information amount signal supplied from the write buffer 1315 and the temperature signal supplied from the temperature detector 1307, the situation analyzer 1309 outputs the digital detection signal.

The detection controller 1310 outputs a blocking control signal and a detection control signal as respective digital signals in response to the detection signal supplied from the situation analyzer 1309. Also, in accordance with a write instruction signal supplied from a writing controller 1314, the detection controller 1310 further generates a write signal.

On receiving a high-level detection control signal from the detection controller 1310, the offset detector 1311 detects the electrical offset in the output signal of the low pass filter 1302, thereby outputting an offset signal.

The detected value memory 1312 stores the value of the output offset signal of the offset detector 1311 on the trailing edge of a detection control signal pulse supplied from the detection controller 1310.

In response to the update and detection signals supplied from the situation analyzer 1309, the correction value calculator 1313 reads out the values stored in the detected value memory 1312 and temperature memory 1308, calculates a correction value for the electrical offset, and then outputs the correction signal.

Figure 16:
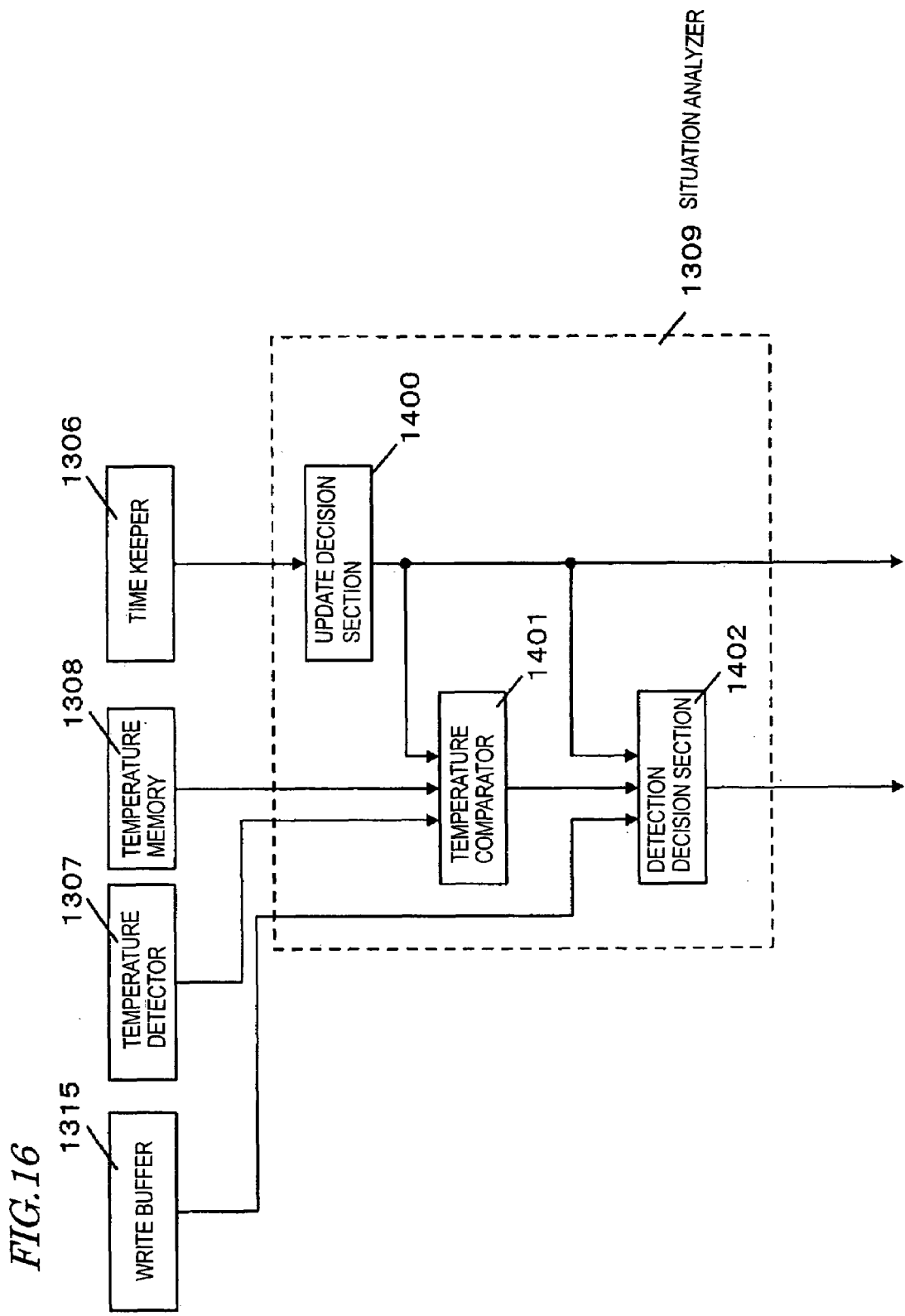
FIG. 16 is a block diagram of the situation analyzer 1309 shown in FIG. 15.

Hereinafter, the situation analyzer 1309 will be described in further detail with reference to FIG. 16, which shows an exemplary arrangement of functional blocks for the situation analyzer 1309. As shown in FIG. 16, the situation analyzer 1309 includes an update decision section 1400, a temperature comparator 1401 and a detection decision section 1402. In response to the timing signal supplied from the time keeper 1306, the update decision section 1400 outputs the digital update signal. The high-level update signal instructs that update should be done, while the low-level update signal instructs that no update should be done.

On the leading edge of each update signal pulse supplied from the update decision section 1400, the temperature comparator 1401 determines whether or not there are two temperature values, which are different from that of the temperature signal currently supplied from the temperature detector 1307 by at most a predetermined value, among the temperature values stored in the temperature memory 1308. If the answer is NO, then the temperature comparator 1401 outputs a high-level temperature comparison signal. If the answer is YES, then the temperature comparator 1401 outputs a low-level temperature comparison signal. In accordance with the update signal supplied from the update decision section 1400, the write information amount signal supplied from the write buffer 1315 and the temperature comparison signal supplied from the temperature comparator 1401, the detection decision section 1402 outputs a digital detection signal. The high-level detection signal instructs that detection should be done, while the low-level detection signal instructs that no detection should be done.

Hereinafter, the update signal and detection signal to be output from the situation analyzer 1309 will be described in detail with reference to FIG. 17. It will also be described how the time keeper 1306 and respective components of the situation analyzer 1309 operate in association with each other.

Figure 17:
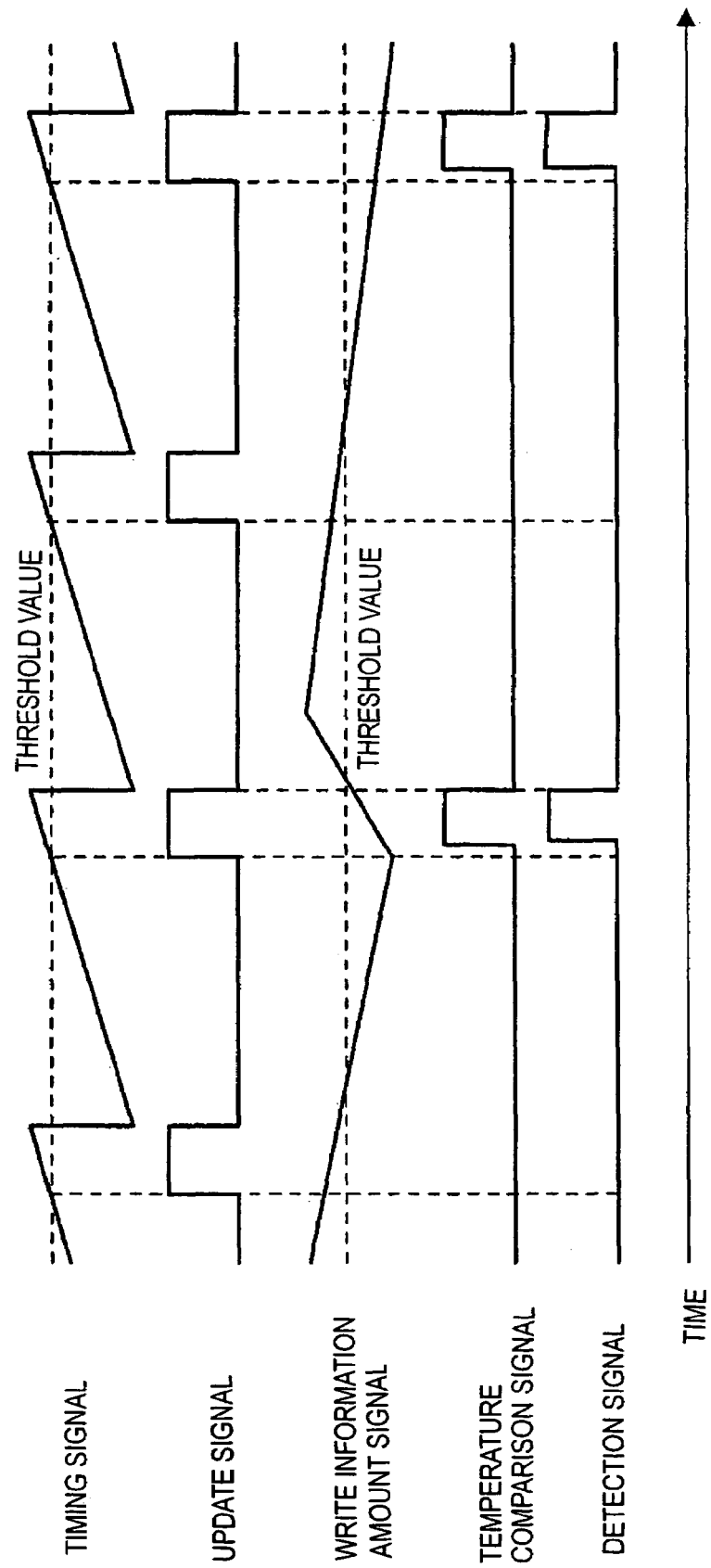
FIG. 17 is a timing diagram showing the waveforms of signals that are associated with the situation analyzer 1309.

FIG. 17 is a timing diagram showing the waveforms of signals that are associated with the situation analyzer 1309.

The timing signal is reset on the trailing edge of each update signal pulse, and represents how much time has passed since the trailing edge of the last update signal pulse. Once the value of the timing signal exceeds a predetermined threshold value, the update decision section 1400 maintains the update signal at the high level for a certain period of time. The high-level update signal instructs that update should be done, while the low-level update signal instructs that no update should be done.

As described above, the temperature comparison signal is the output signal of the temperature comparator 1401 and shows whether or not the temperature values stored in the temperature memory 1308 include values that are different from the actual temperature value by at most a predetermined value. It should be noted that the trailing edge of each temperature comparison signal pulse is synchronous with that of its associated update signal pulse.

The detection signal is a digital output signal of the detection decision section 1402. In the vicinity of the leading edge of any update signal pulse, if the value of the write information amount signal is a predetermined value or less and if the temperature comparison signal is high, then the detection signal goes high. Otherwise, the detection signal remains low. It should be noted that the trailing edge of each detection signal pulse is synchronous with that of its associated update signal pulse. The high-level detection signal instructs that detection should be done, while the low-level update signal instructs that no detection should be done.

As shown in FIG. 17, pulses of the update signal are generated at regular intervals. As described above, if the amount of information stored in the write buffer 1315 is a predetermined value or less and if the temperature values stored in the temperature memory 1308 include two values that are different from that of the temperature signal currently supplied from the temperature detector 1307 by not more than a predetermined value, the update signal is kept high for a certain period of time.

Figure 18:
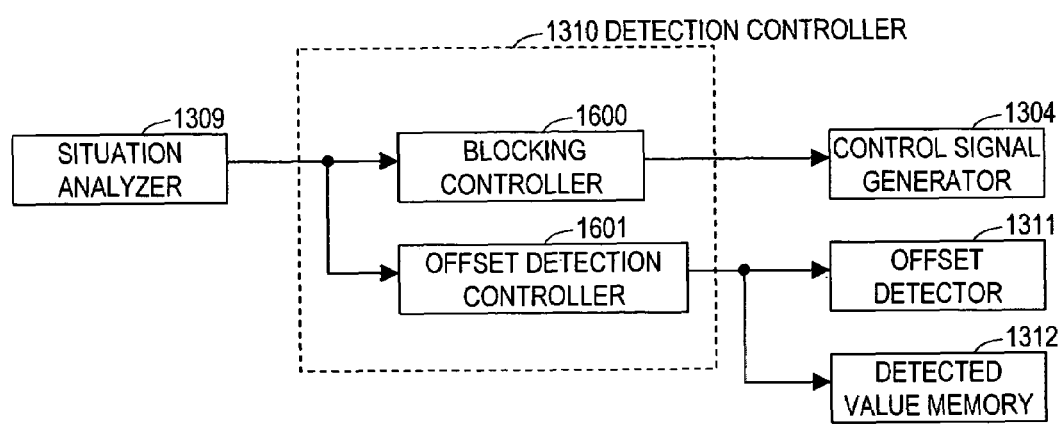
FIG. 18 is a block diagram of the detection controller 1310 shown in FIG. 15.

Hereinafter, the detection controller 1310 will be described. FIG. 18 shows an exemplary arrangement of functional blocks for the detection controller 1310. As shown in FIG. 18, the detection controller 1310 includes a blocking controller 1600 and an offset detection controller 1601. Based on the amount of time that has passed since the output detection signal of the situation analyzer 1309 rose to the high level, the blocking controller 1600 generates a blocking control signal and outputs it to the control signal generator 1304. The offset detection controller 1601 generates a detection control signal and outputs it to the offset detector 1311 and detected value memory 1312. The timing relationship between these signals will be briefly described with reference to FIG. 19.

Figure 19:
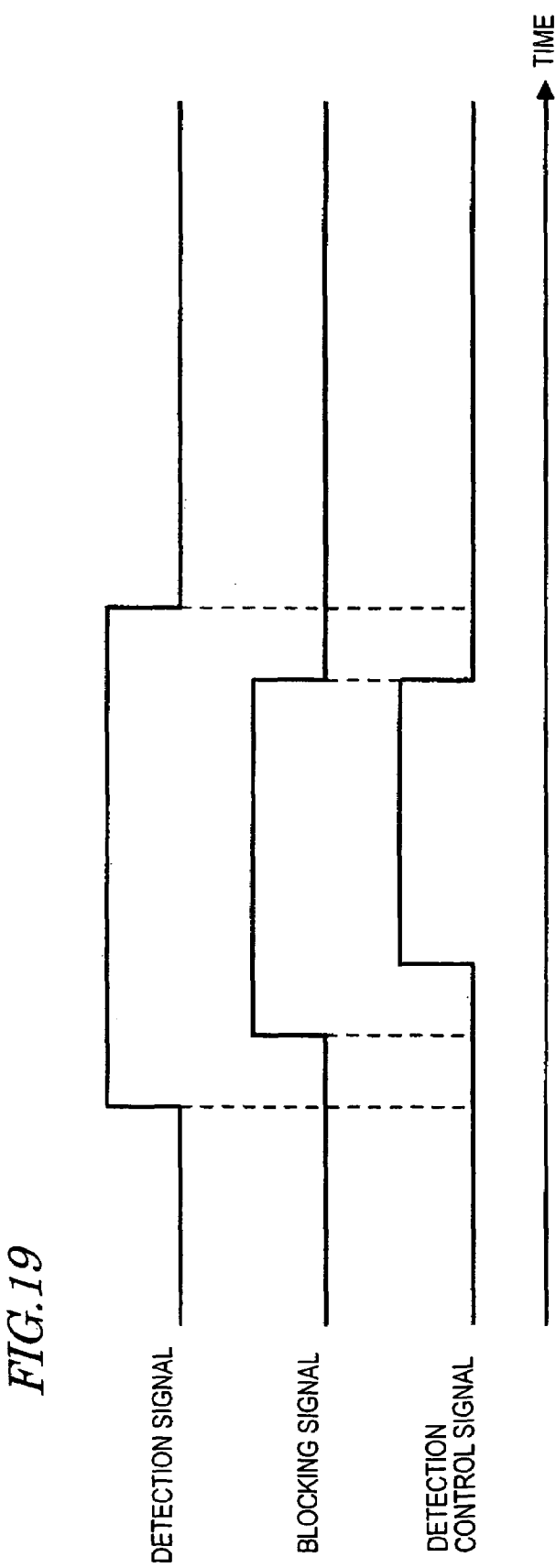
FIG. 19 is a timing diagram showing the waveforms of signals that are associated with the detection controller 1310.

FIG. 19 is a timing diagram showing the waveforms of signals that are associated with the detection controller 1310. As already described with reference to FIG. 17, the detection signal is output from the situation analyzer 1309. The leading edge of the blocking signal pulse is behind that of its associated detection signal pulse and the trailing edge thereof is ahead of that of the detection signal pulse. The leading edge of the detection control signal is behind that of its associated blocking signal pulse and the trailing edge thereof is synchronous with that of the blocking signal pulse.

Hereinafter, the temperature memory 1308 and detected value memory 1312 will be described in further detail.

On the trailing edge of each detection signal pulse, the temperature memory 1308 stores the values of the temperature signal supplied from the temperature detector 1307 in its information storage area one after another. On the other hand, on the trailing edge of each detection control signal pulse, the detected value memory 1312 stores the values of the offset signal supplied from the offset detector 1311 in its information storage area one after another.

FIG. 19 shows that the trailing edge of the detection signal pulse is definitely different from that of the detection control signal pulse. However, this time gap is much shorter than the length of the electrical offset correcting operation (i.e., the interval between the point in time the electrical offset starts being corrected and the point in time the electrical offset finishes being corrected). Thus, these two trailing edges may be regarded as approximately identical with each other. That is to say, the temperature signal value stored in the temperature memory 1308 and the offset signal value stored in the detected value memory 1312 may be regarded as two values that are sampled at approximately the same points in time. Accordingly, by looking through the values stored in the temperature memory 1308 and detected value memory 1312 sequentially, the temperature and offset signal values that were sampled at almost the same points in time can be looked up.

Next, the correction value calculator 1313 will be described in detail with reference to FIGS. 15 and 17. The correction value calculator 1313 calculates the correction value after the update signal has fallen to the low level.

If the detection signal is high when the update signal is high, then the electrical offset value that was stored in the detected value memory 1312 when the detection control signal fell last time, i.e., the actual electrical offset value, is adopted as it is.

On the other hand, if the detection signal is low when the update signal is high, then the temperature memory 1308 searches its stored temperature values for two values, which are close to the value of the temperature signal output from the temperature detector 1307 on the trailing edge of the update signal pulse, and read them out. Next, the electrical offset values that were stored in the detected value memory 1312 when these temperature values were stored in the temperature memory 1308 are searched for and read out. The two temperature values found are supposed to be identified by T0 and T1, respectively, the two electrical offset values corresponding to these temperature values are supposed to be identified by Os0 and Os1, respectively. The actual temperature signal value is supposed to be identified by T2 and the newly calculated correction value is supposed to be identified by C.

In that case, the correction value calculator 1313 calculates the correction value C by the following Equation (5):

$$C=(Os1-Os0)\times(T2-T1)/(T1-T0)+Os1 \quad (5)$$

At this time, no actual electrical offset is detected, and therefore, the correction value calculator 1313 estimates the actual electrical offset value from its past values and uses the estimated value as the correction value. Specifically, the correction value calculator 1313 calculates the estimated electrical offset value based on two electrical offset values that are closest to, and next closest to, the actual electrical offset value and two temperature values that are closest to, and next closest to, the actual temperature value on the supposition that the electrical offset changes linearly with the temperature.

Figure 20:
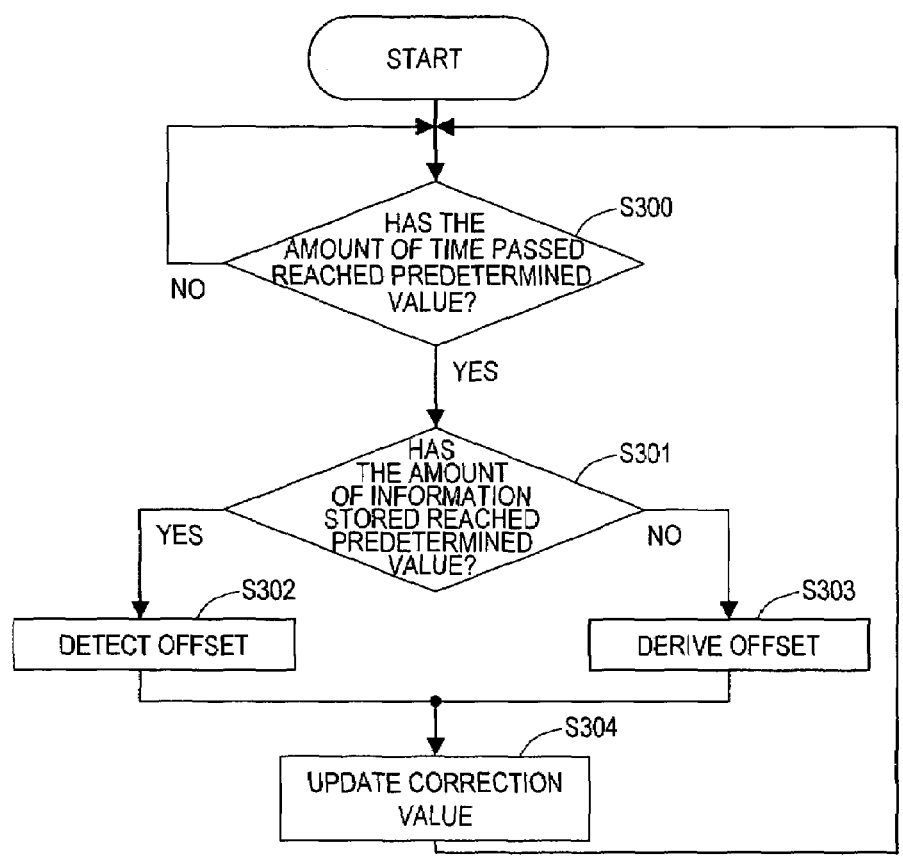
FIG. 20 is a flowchart showing how the optical disc drive 39 operates.

Hereinafter, it will be described with reference to FIG. 20 exactly how the optical disc drive 39 of this third preferred embodiment operates. FIG. 20 shows an exemplary procedure in which the optical disc drive 39 operates.

First, in Step S300, the situation analyzer 1309 determines whether or not a predetermined amount of time has passed since the offset correction value was updated last time. This step S300 is performed repeatedly until the predetermined amount of time has passed. If the answer is YES, the processing advances to the next step S301. In that next step S301, the situation analyzer 1309 determines whether or not the amount of information stored in the write buffer 1315 is a predetermined amount or less. If the answer is YES, then the processing advances to Step S302. Otherwise, the processing advances to Step S303.

In Step S302, the offset detector 1311 detects the offset. Hereinafter, the offset detection process will be described in detail with reference to FIGS. 15 and 19. First, when the situation analyzer 1309 generates the detection signal (i.e., when the detection signal rises to the high level), the control signal generator 1304 holds the previous or current value of the tracking control signal. While the value of the tracking control signal is being held in this manner, the lens driver 7 outputs a drive signal instructing that the objective lens 5 be fixed. Once the objective lens 5 is fixed at a position with respect to the optical disc 1, the laser beam spot is also fixed at a position that is defined in the radial direction of the optical disc 1 where the beam spot has been until the tracking control signal value is held.

When the detection signal rises to the high level, the low pass filter 1302 switches its cutoff frequency into a higher value. In the interval between the leading edge of the detection signal pulse and that of the blocking signal pulse, the control signal generator 1304 holds the level of the tracking control signal. It should be noted that this holding interval includes the time it takes to switch the cutoff frequencies of the low pass filter 1302.

After the low pass filter 1302 has switched the cutoff frequencies, the detection controller 1310 generates the blocking signal (i.e., the blocking signal rises to the high level), thereby making the laser diode 2 stop emitting the laser beam. At this point in time, the output signal value of the low pass filter 1302 represents the value of the electrical offset. The electrical offset is detected under the same principle as that already described for the first preferred embodiment.

It should be noted that the time it takes for the output signal of the low pass filter 1302 to settle at the electrical offset value depends on the higher cutoff frequency of the low pass filter 1302. The interval between the leading edge of the blocking signal pulse and that of the detection control signal pulse is defined so as to include this settling time.

After the output signal value of the low pass filter 1302 has settled at the electrical offset value, the detection control signal rises to the high level and the offset detector 1311 detects the electrical offset value. The width of the detection control signal pulse is defined so as to be long enough for the offset detector 1311 to detect the electrical offset value.

When the electrical offset is detected successfully, the detection control signal and blocking signal both go low and the laser diode 2 starts emitting the laser beam again. Then, the output signal value of the low pass filter 1302 recovers its original value as defined by the light quantity signal. The recovery time depends on the higher cutoff frequency of the low pass filter 1302. The interval between the trailing edge of the blocking signal pulse or the detection control signal and that of the detection signal pulse is defined so as to include this recovery time.

When the output signal of the low pass filter 1302 recovers that value defined by the light quantity signal, the detection signal becomes low and the cutoff frequency of the low pass filter 1302 switches into the lower one. In addition, the hold signal also becomes low and the level of the tracking control signal is not held anymore. As a result, the laser beam spot is adjusted in the radial direction of the optical disc 1 so as to follow the target track just as intended. In this manner, the electrical offset is detected.

Referring back to FIG. 20, in Step S303, the correction value calculator 1313 derives the electrical offset value at the actual temperature by performing a linear calculation on the past temperature values stored in the temperature memory 1318 and on the past electrical offset values stored in the detected value memory 1312.

Finally, in Step S304, the correction value is updated using the electrical offset value that has been detected in Step S302 or the electrical offset value that has been derived in Step S303. Thereafter, the processing goes back to Step S300 again.

The optical disc drive 39 of the third preferred embodiment described above updates the correction value either by detecting the electrical offset or by deriving the actual electrical offset value based on the past temperature and electrical offset values, thereby correcting the electrical offset with the newly updated correction value. As a result, information can be transferred at a sufficiently high rate from the optical disc drive 39 to the buffer memory, or vice versa, with the read and/or write operation of the optical disc drive 39 suspended much less frequently.

Also, the optical disc drive 39 updates the correction value at regular intervals, and therefore, the transfer rate between the drive and the buffer memory can be maintained at least at a constant value.

The electrical offset is detected only when the amount of information stored in the write buffer is equal to or less than a predetermined amount. Thus, the transfer rate between the host computer and the buffer memory can also be maintained at least at a constant value. In that case, there will be no problem even if the transfer rate between the drive and the buffer memory decreases during a write operation. Optionally, the amount of information stored in the read buffer may also be detected in the same way, and the electrical offset detection may be prohibited if the amount of the information stored there is equal to or less than a predetermined value.

In that case, the transfer rate may be maintained at least at a constant value during a read operation.

Also, if the actual electrical offset value is calculated based on previously detected temperature and electrical offset values, then values that are close to the actual electrical offset and temperature values are searched for in the previously detected and currently stored electrical offset and temperature values. Accordingly, after electrical offsets have been detected a good number of times, no electrical offsets need to be detected anymore. As a result, information can be transferred from the drive to the buffer memory, or vice versa, at a sufficiently high rate.

Furthermore, if none of the temperature values stored is different from the actual temperature value by not more than a predetermined value (i.e., if each of the temperature values stored is different from the actual temperature value by more than the predetermined value), then the temperature comparison signal supplied from the temperature comparator 1401 instructs that the electrical offset should be detected. Accordingly, even if the electrical offset changes non-linearly with the temperature, high-precision correction is also realized.

Optionally, as in the second preferred embodiment described above, the optical disc drive of this third preferred embodiment may separately calculate two correction values for a set of circuit settings for reading and another set of circuit settings for writing, respectively, and may switch the correction values according to the set of circuit settings adopted for correction. In that case, the correction can be made with even higher precision.

In the second and third preferred embodiments described above, the electrical offset is detected with the laser emission stopped and with the external inputs to the circuit blocked. Thus, the electrical offset value can be detected highly precisely even without expanding the circuit scale. Also, since the servo signal is held, the servo control operation can be resumed quickly once the electrical offset has been detected. As a result, the optical disc drive has to suspend the data reading or writing operation for a shorter time, and information can be transferred at a sufficiently high rate between the optical disc drive and the buffer memory.

The electrical offset is detected only when the amount of information stored in the read buffer is equal to or more than a predetermined amount. Thus, the transfer rate between the host computer and the buffer memory can also be maintained at least at a constant value. In that case, there will be no problem even if the transfer rate between the drive and the buffer memory decreases during a read operation. Optionally, the amount of information stored in the write buffer may also be detected in the same way, and the electrical offset detection may be prohibited if the amount of the information stored there is equal to or more than a predetermined value. In that case, the transfer rate may be maintained at least at a constant value during a write operation.

Furthermore, as in the first preferred embodiment described above, the electrical offset may also be detected by selecting a signal path that makes a detour around the low pass filter. Also, the electrical offsets may be separately corrected for at least two groups of electric circuits that make up their respective signal paths.

As already described for the first preferred embodiment, when the external inputs to the electric circuits are blocked, the signal obtained just after the quantity of light received has been detected may have its voltage switched into the reference voltage. In that case, the external inputs can be blocked only to circuits that need electrical offset correction. As a result, the electrical offset value can be detected highly precisely without affecting other signal systems seriously.

The preferred embodiments of the present invention described above relate to the configurations and operations of optical disc drives for correcting the electrical offset with respect to a servo signal. However, the optical disc drive of any of the preferred embodiments described above can perform the same type of processing on not only such a servo signal but also on any other signal to be generated from a light quantity signal.

Embodiment 4

Figure 21:
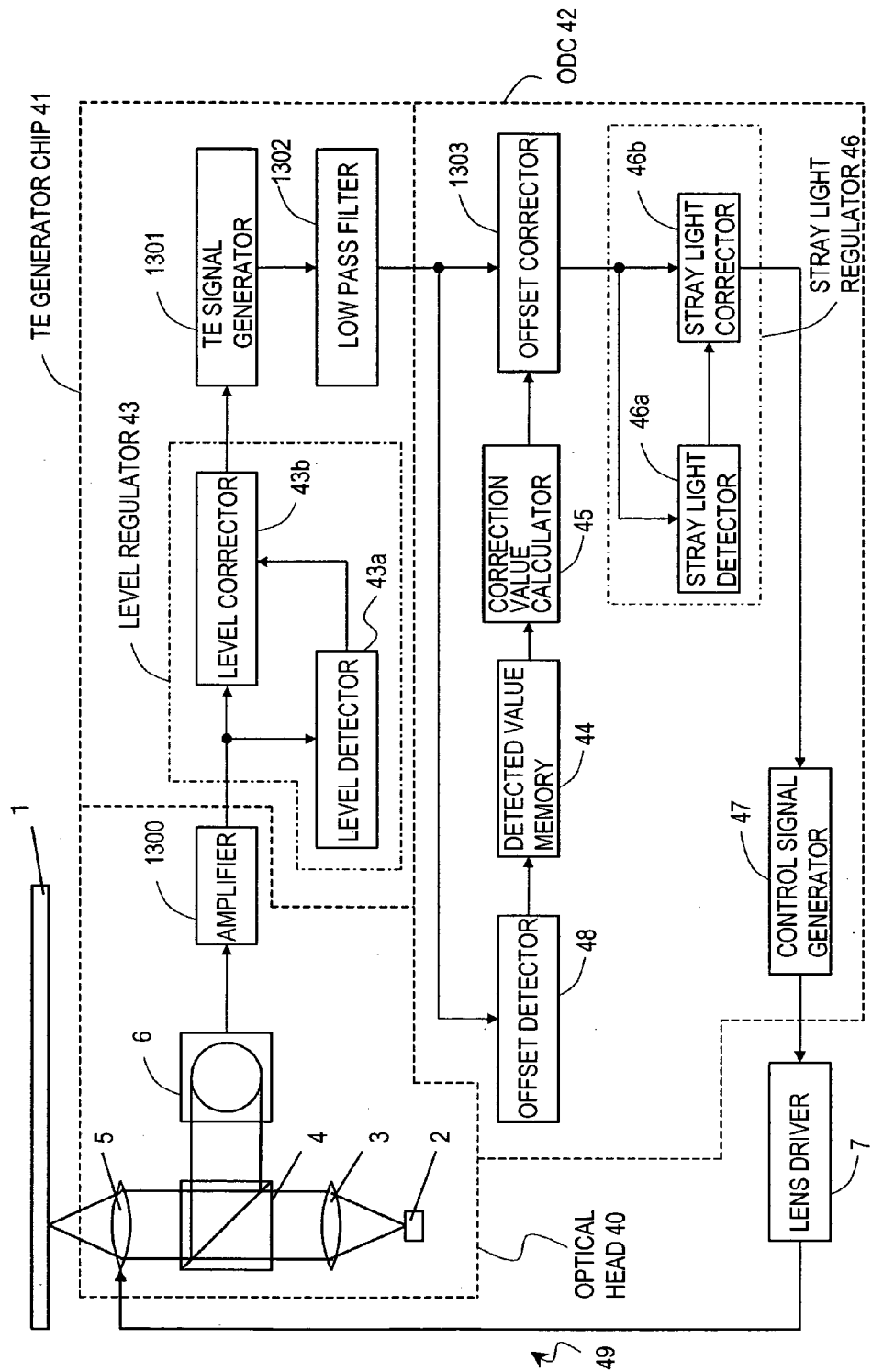
FIG. 21 is a block diagram of an optical disc drive 49 according to a fourth specific preferred embodiment of the present invention.

FIG. 21 shows a configuration for an optical disc drive 49 according to a fourth specific preferred embodiment of the present invention. As shown in FIG. 21, the optical disc drive of this preferred embodiment includes a level regulator 43 and a stray light regulator 46, which are provided to appropriately regulate the levels of signals to be supplied to the TE signal generator 1301 and control signal generator 47, respectively. As a result, this optical disc drive 49 can perform a servo control operation even more precisely.

Hereinafter, the configuration of this optical disc drive 49 will be described in detail. As shown in FIG. 21, the optical disc drive 49 includes an optical head 40, a TE generator chip 41, an optical disc controller (ODC) 42 and a lens driver 7.

The optical head 40 includes a laser diode 2, a collimator lens 3, a beam splitter 4, an objective lens 5, a light quantity detector 6 and an amplifier 1300, all of which have the same functions, and operate in quite the same way, as the counterparts of the optical disc drive 19 of the first preferred embodiment described above. Thus, the description thereof will be omitted herein.

As for this optical head 40, however, it should be noted that the output signal of the optical head 40 includes a signal component resulting from stray light. As used herein, the "stray light" refers to components of the laser beam, which are diffused on the optical path that passes the collimator lens 3, beam splitter 4 and objective lens 5 of the optical head 40. For example, it is known that a portion of the laser beam that is radiated toward the optical disc 1 by way of the collimator lens 3 is reflected back by the objective lens 5 toward the collimator lens 3 again. The component of light returning toward the collimator lens 3 is called "stray light". The stray light, as well as the light that has been reflected from the disc 1, is detected by the light quantity detector 6, of which the detection signal is amplified by the amplifier 1300. Thus, the signal component resulting from the stray light will be referred to herein as a "stray light signal" and its signal level will be referred to herein as a "stray light offset". In the optical disc drive of this preferred embodiment, the stray light regulator 46 to be described later can eliminate the stray light signal.

The TE generator chip 41 includes the level regulator 43, TE signal generator 1301 and low pass filter 1302. The TE signal generator 1301 and low pass filter 1302 are the same as the counterparts of the optical disc drive 39 of the third preferred embodiment described above, and the description thereof will be omitted herein. The TE generator chip 41 including the level regulator 43 may be produced as a semiconductor integrated circuit (IC) and incorporated into this optical disc drive.

The level regulator 43 includes a level detector 43*a* and a level corrector 43*b* so as to regulate the level of the amplified signal supplied from the amplifier 1300 and output a regulated signal. Hereinafter, the configuration and operation of the level regulator 43 will be described in detail with reference to FIGS. 22A through 22D. It should be noted that the level regulator 43 is supposed to operate (i.e., regulate the level of the amplified signal) in a situation where the laser diode 2 is ON and the optical disc drive is performing neither a focus control operation nor a tracking control operation.

Figure 22A:
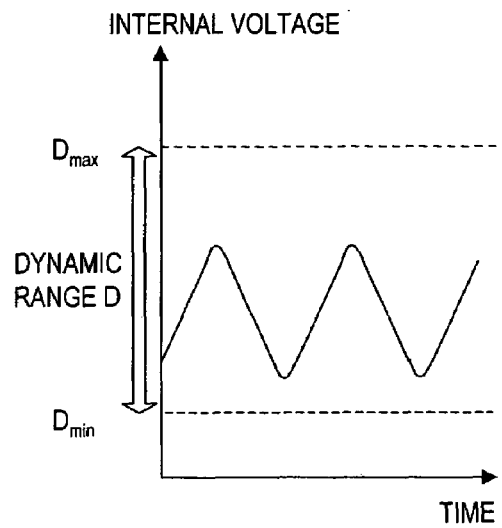
FIG. 22A shows a dynamic range D as the processible range of an internal amplifier of the TE signal generator 1301 shown in FIG. 21.
Figure 22B:
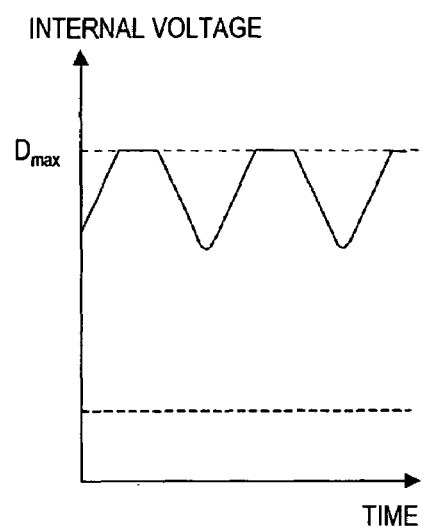
FIG. 22B shows a situation where the highest level of an internal signal exceeds the upper limit value Dmax.
Figure 22C:
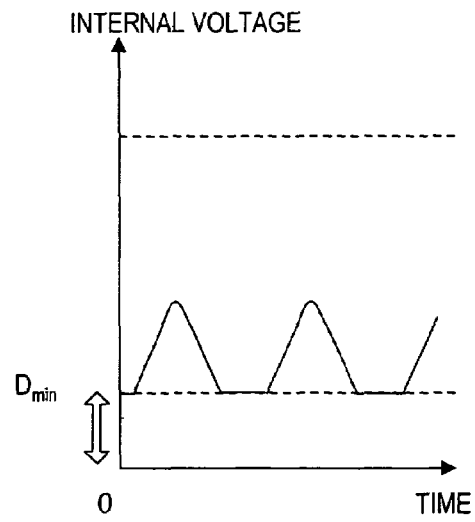
FIG. 22C shows a situation where the lowest level of an internal signal does not reach the lower limit value Dmin.

The specifications of the level regulator 43 are defined in view of the processing capacity of the TE signal generator 1301. FIG. 22A shows a dynamic range D in which the amplifier (not shown) included in the TE signal generator 1301 can perform its expected processing. The dynamic range D is defined by a lower limit value Dmin and an upper limit value Dmax. That is to say, the TE signal generator 1301 can normally process an internal signal of which the amplitude does not exceed the dynamic range D and can generate the TE signal. However, if the level of the internal signal exceeds the upper limit value Dmax as shown in FIG. 22B, then the TE signal generator 1301 cannot process the saturated signal components that exceed the upper limit value Dmax. Also, even if the level of the internal signal is short of the lower limit value Dmin as shown in FIG. 22C, the TE signal generator 1301 cannot process the signal components that do not reach the lower limit value Dmin (i.e., so-called "dead-zone components").

Figure 22D:
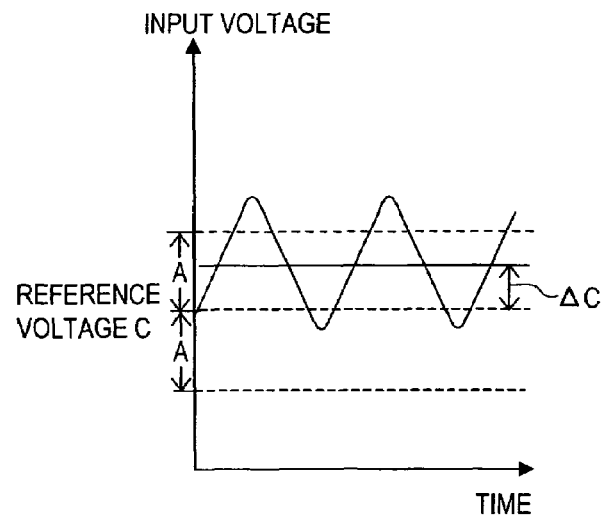
FIG. 22D shows input signal ranges falling within the dynamic range D of the TE signal generator 1301.

The level of the internal signal to be transmitted inside of the TE signal generator 1301 may be changeable with the level of the input signal. Alternatively, the input signal may be used as the internal signal of the TE signal generator 1301 as it is. Thus, the level regulator 43 regulates the level of the signal being input to the TE signal generator 1301 such that the internal signal of the TE signal generator 1301 falls within the dynamic range D shown in FIG. 22A. FIG. 22D shows input signal levels falling within the dynamic range D of the TE signal generator 1301. If the input signal level (i.e., input voltage) falls within the range of C±A (where C is the reference voltage), then the internal signal of the TE signal generator 1301 falls within the range shown in FIG. 22A. The signal shown in FIG. 22D has its center of amplitude defined at a voltage that is higher than the reference voltage C by ΔC. The reference voltage C and the amplitude (±A) as defined with respect to the reference voltage C are determined by the maximum and minimum values of a known variation range of an optical disc drive during its read or write operation.

In the level regulator 43, the level detector 43a continuously detects the level of the signal supplied from the amplifier 1300 for a certain period of time (e.g., over a number of periods of the signal) and passes the result of detection to the level corrector 43b. In response, the level corrector 43b calculates the difference ΔC from the reference voltage C and adds (−ΔC) to the input signal level, thereby correcting the signal level. In this manner, the level corrector 43b obtains a signal, of which the center of amplitude is equal to the reference voltage C, and outputs that signal to the TE signal generator 1301. As a result of these processing steps, the TE signal generator 1301 can operate normally and can obtain a highly precise TE signal. It should be noted that even if the voltage defining the center of amplitude of a signal is equalized with the reference voltage C, the amplitude of the signal may still be greater than the amplitude A described above. In that case, the level corrector 43b may further multiply that signal by a constant and correct the level of the signal such that the maximum and minimum values of its amplitude have absolute values falling within the range C±A.

It should be noted that to change the level of an input signal means to apply an electrical offset (−ΔC) to the level of the input signal. This offset may be provided either as a single arbitrary value or one of multiple stepped values (such as −10 mV, −20 mV and so on).

According to this processing, even if the TE signal generator 1301 has a narrow dynamic range, the TE signal generator 1301 can also be operated normally with its power dissipation cut down. Furthermore, by narrowing the dynamic range of the TE signal generator 1301 that performs analog calculations, the A/D conversion can have an increased resolution when a signal is input to the control signal generator 47 that performs digital computations.

Next, the ODC 42 will be described. As shown in FIG. 21, the ODC 42 includes an offset detector 48, a detected value memory 44, a correction value calculator 45, an offset corrector 1303, the stray light regulator 46 and the control signal generator 47.

The functions of the offset detector 48, detected value memory 44, correction value calculator 45 and offset corrector 1303 are the same as those of the counterparts shown in FIG. 1, for example. Specifically, the offset detector 48 detects an offset based on the output signal of the low pass filter 1302. The detected value memory 44 stores all offset signal values supplied from the offset detector 48. The correction value calculator 45 reads out the offset signal values from the detected value memory 44, calculates a correction value for the electrical offset and outputs a correction signal. In accordance with the correction value supplied from the correction value calculator 45, the offset corrector 1303 corrects the output signal of the low pass filter 1302. It should be noted that the offset detector, detected value memory, correction value calculator and offset corrector, which are included in each of the optical disc drives of the first, second and third preferred embodiments described above, are shown in FIG. 21.

By performing these processing steps, the electrical offset produced in an amplifier or any other component of an optical disc drive can be corrected. In addition, according to this correcting technique, the electrical offset that has been intentionally applied to the signal by the level regulator 43 can also be corrected. For example, suppose the level corrector 43b applies an offset value of −10 mV that has been selected from multiple stepped values. In that case, if the unintentionally produced electrical offset can be eliminated with the application of offset of −13 mV, then the difference of −3 mV between −10 mV and −13 mV will be the electrical offset that has been intentionally applied to the signal. The offset corrector 1303 can correct not only this intentionally applied electrical offset but also other electrical offsets that have ever been produced in the optical disc drive as well.

Next, the configuration and operation of the stray light regulator 46 will be described. The stray light regulator 46 includes a stray light detector 46a and a stray light corrector 46b and eliminates stray light produced on the optical path in the optical head 40. Under predetermined conditions, only the stray light signal is input to the stray light regulator 46. The predetermined conditions include herein that the laser diode 2 is ON, that no focus control or tracking control operation is being carried out, and that the light quantity detector 6 is receiving no reflected light from the optical disc 1 (e.g., that the objective lens 5 is sufficiently distant from the optical disc 1). When the stray light regulator 46 regulates the stray light, these conditions need to be satisfied in this preferred embodiment.

To prevent the light quantity detector 6 from receiving the reflected light, the lens driver 7 supplies a drive signal of a predetermined level to a focus actuator (not shown), which is physically connected to the lens 5. In response to the drive signal, the focus actuator moves the objective lens 5 perpendicularly to, and away from, the optical disc 1 and for a sufficient distance. Such an operation is done by the lens driver 7 in accordance with the control signal supplied from the control signal generator 47. Also, in reading or writing data from/on the data storage layer of the optical disc 1, the lens driver 7 outputs a drive signal to the focus actuator such that the focal point of the light beam is located right on the data storage layer.

The lens driver 7 can drive the lens 5 not only perpendicularly to the optical disc 1 but also along the radius of the optical disc 1. In the latter case, the lens driver 7 supplies a drive signal to a tracking coil, which is physically connected to the lens 5. In response to the drive signal, the tracking coil moves the lens 5 in the radial direction of the optical disc 1. In this manner, the beam spot of the light beam can be controlled so as not to come off the target track. If the optical head 40 needs to be moved in the radial direction for too long a distance for the tracking coil to cope with, then the optical head 40 may be moved on a transport stage (not shown) to the vicinity of the target track and then precisely controlled by the tracking coil so as to keep the target track.

The stray light detector 46a detects and holds the level of the stray light signal (i.e., the stray light offset). Then, the stray light corrector 46b subtracts the stray light offset from the output signal of the offset corrector 1303, thereby eliminating the stray light signal easily. As a result, the control signal generator 47 can generate a control signal that is not affected by any stray light at all based on the signal received from the stray light corrector 46b, thus realizing a high-precision tracking control operation.

Figure 23:
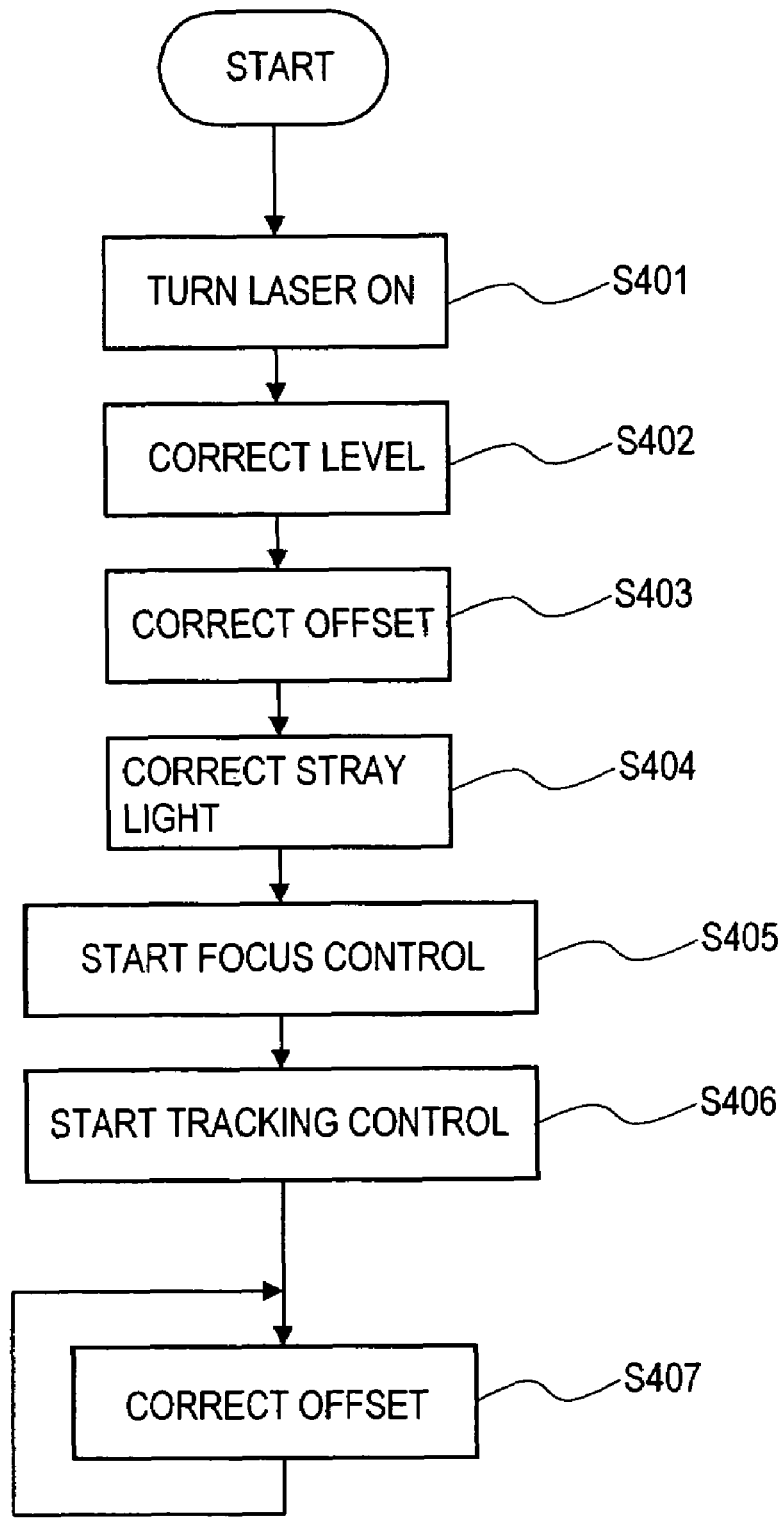
FIG. 23 is a flowchart showing how the optical disc drive of the fourth preferred embodiment performs correction processing.

Hereinafter, it will be described with reference to FIG. 23 how the optical disc drive of this preferred embodiment performs a series of processing steps to correct the level and stray light. FIG. 23 shows a procedure in which the optical disc drive of this preferred embodiment performs those correcting operations. First, in Step S401, the laser diode 2 is turned ON to emit a laser beam. At this point in time, the optical disc drive is performing neither any focus control operation nor tracking control operation, and the objective lens 5 is perpendicularly moved to such a position that the light quantity detector 6 receives no reflected light from the optical disc 1.

Next, in Step S402, the level regulator 43 corrects the level, thereby regulating the level of the signal to be input to the TE signal generator 1301. In the next step S403, the offset corrector 1303 corrects the electrical offset. Subsequently, in Step S404, the stray light regulator 46 detects the stray light offset and corrects the stray light as well.

When the electrical offset and stray light offset are both corrected as a result of these processing steps S401 through S404, the optical disc drive performs a focus control in the next step S405 such that the light beam is focused right on the data storage layer of the optical disc 1. Thereafter, in Step S406, the optical disc drive performs a tracking control operation such that the beam spot of the light beam keeps the intended track on the optical disc 1. Once the optical disc drive starts an operation of reading or writing data from/on the optical disc 1 after that, the optical disc drive will perform Step S407 at regular intervals.

In this step S407, the offset corrector 1303 detects or estimates the electrical offset and corrects it if necessary. The offset correction does not have to be performed at such regular intervals. Alternatively, this step S407 may also be carried out every time a temperature detector senses that a predetermined temperature is reached as in the optical disc drive of the first preferred embodiment described above.

Unlike the electrical offset correction, the processing step S404 of correcting the stray light needs to be carried out only when the optical disc drive is turned ON. This is because the temperature variation occurring after the optical disc drive has been turned ON just affects the stray light to a substantially negligible degree. In correcting the stray light, however, the optical disc drive may detect and correct the stray light offset using different settings for data reading and writing operations as in the second preferred embodiment described above. In that case, the setting controller 715 may selectively supply either optical power for reading or optical power for writing to the laser diode 2.

The optical disc drive shown in FIG. 21 includes both the level regulator 43 and the stray light regulator 46. Alternatively, the optical disc drive may include just one of these two regulators. The level regulator 43 and stray light regulator 46 operate independent of each other. Thus, the objects described above are achievable just by operating at least one of these regulators under the conditions specified above.

Figure 24:
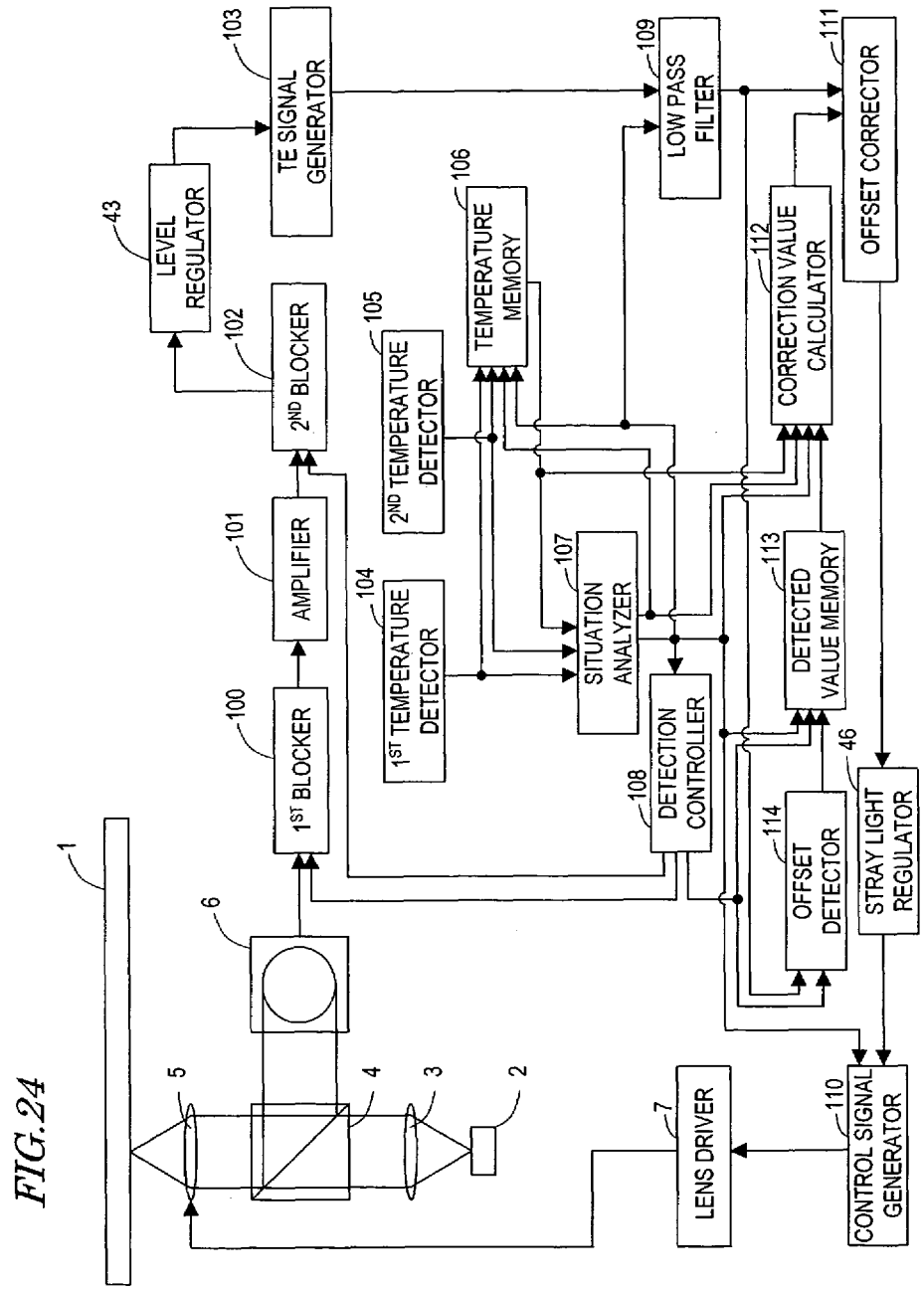
FIG. 24 is a block diagram showing a configuration for an alternative optical disc drive obtained by adding a level regulator 43 and a stray light regulator 46 to the optical disc drive of the first preferred embodiment.
Figure 25:
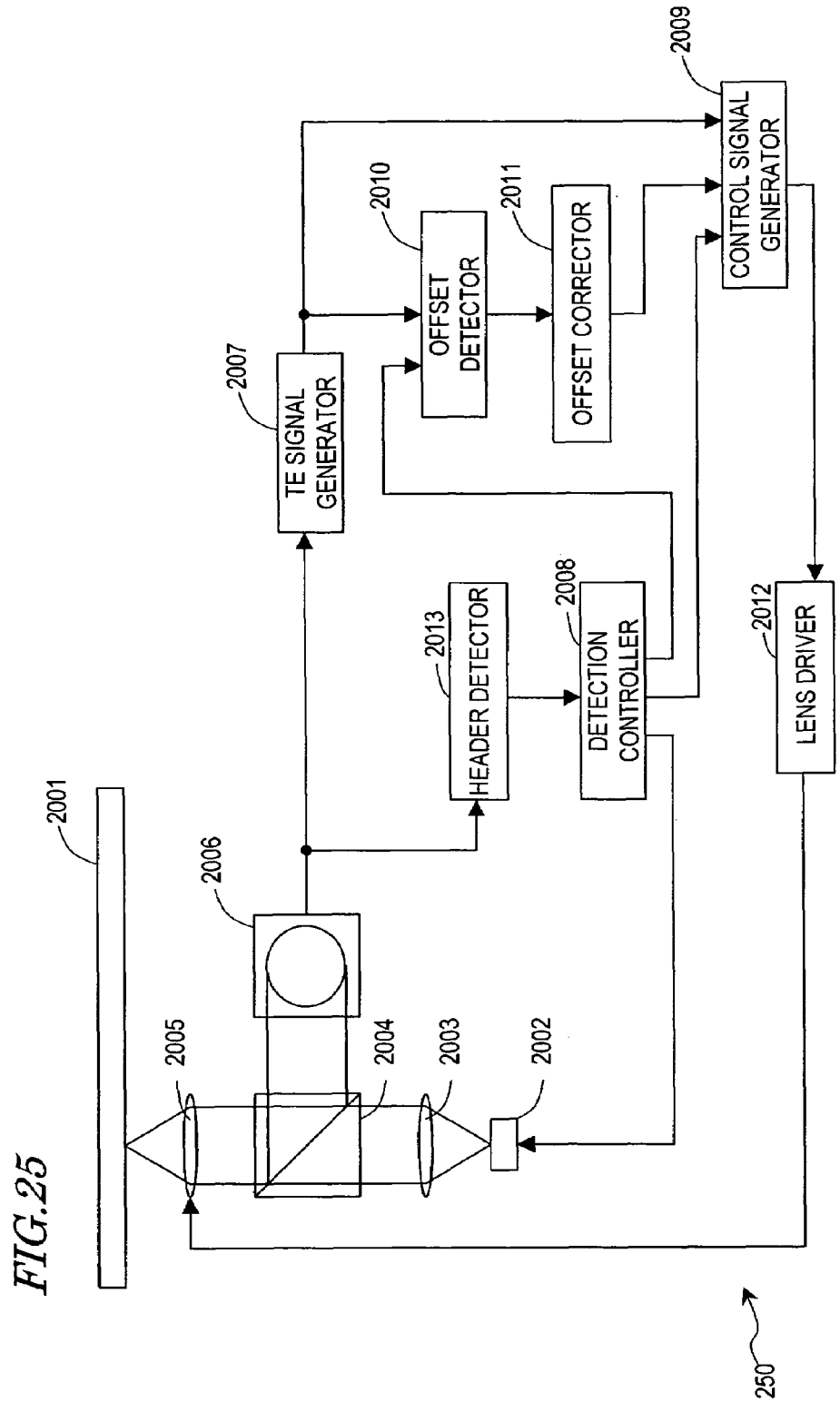
FIG. 25 is a block diagram of a conventional optical disc drive.

The level regulator 43 and/or the stray light regulator 46 may be incorporated into the optical disc drive of the first, second or third preferred embodiment described above. FIG. 24 shows an exemplary configuration for an alternative optical disc drive obtained by adding the level regulator 43 and stray light regulator 46 to the optical disc drive of the first preferred embodiment described above. In the preferred embodiment shown in FIG. 24, the level regulator 43 is provided between the second blocker 102 and the TE signal generator 103 so as to regulate the level of the signal to be input to the TE signal generator 103. On the other hand, the stray light regulator 46 is provided between the offset corrector 111 and the control signal generator 110, thereby realizing high-precision tracking and focus control operations. Meanwhile, if the level regulator is added to the optical disc drive of the second preferred embodiment described above, the level regulator may be provided between the amplifier 700 and the FE signal generator 701 so as to regulate the level of the signal to be input to the FE signal generator 701. In that case, the FE signal generator 701 can operate normally and a high-precision FE signal can be obtained. Furthermore, since the dynamic range of the FE signal generator 701 can be narrowed, the advantages described above are also achievable.

An optical disc drive with two or more functions to correct offsets, which are described as functions of the optical disc drives of the first, second and third preferred embodiments described above, can be obtained. For example, the optical disc drive can independently correct each electrical offset superposed on the TE signal and FE signal by operating as similar to the optical disc drive of the first preferred embodiments for the TE signal, and the second preferred embodiments for the FE signal.

Optical disc drives of the first, second, third and fourth preferred embodiments described above may be different from each other in how to block the external inputs in detecting the electrical offset, how to eliminate the electrical offsets from respective circuit sections, what settings should be adopted for read and write operations, how to calculate the correction value, in what situation the correction value should be updated and/or in what situation the electrical offset should be detected. However, these methods and operation conditions including the settings may be arbitrarily combined with each other so as to transfer information at a sufficiently high rate and correct the offset, level and stray light with rather high precision. As a result, the quality of the resultant servo signal improves and high-precision servo controls are realized.

In the preferred embodiments of the present invention described above, the present invention is applied to a tracking control operation and a focus control operation as exemplary servo control operations. Thus, the TE and FE signals, TE and FE generator chips and TE and FE signal generators may be collectively referred to as servo signals, servo signal generator chips and servo signal generators, respectively.

According to various preferred embodiments of the present invention described above, the electrical offset is adaptively corrected either by detecting the electrical offset or by calculating the actual electrical offset based on past temperature and electrical offset values. Thus, the optical disc drive needs to suspend its read or write operation much less frequently and information can be transferred at a sufficiently high rate from the optical disc drive to a buffer memory, or vice versa.

This application is based on Japanese Patent Applications No. 2002-362048 filed on Dec. 13, 2002 and No. 2003-334464 filed on Sep. 26, 2003, the entire contents of which are hereby incorporated by reference.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical disc drive for reading and/or writing data from/on an optical disc having a data storage layer, the optical disc drive comprising:
   a light source for emitting light;
   a lens for converging the light;
   a photodetector for detecting the light reflected from the optical disc to output a read signal;
   at least one blocker for selectively outputting one of the read signal and a predetermined reference signal;
   a servo signal generator for generating a servo signal in response to the output signal of the blocker;
   an offset detector for detecting a first type of offsets that have been produced due to one of electric circuits of the servo signal generator, the offset detector detects output values of the servo signal generator as values of the first type of the offsets while the reference signal is output;
   a memory for storing the first type of offsets detected;
   a calculator for outputting one of the first type of actual offset and a second type of offset, as a correction value, the calculator deriving the second type of offset based on a variation rate of the first type of offsets stored; and
   a corrector for correcting the servo signal in accordance with the correction value.

2. The optical disc drive according to claim 1, further comprising:
   a sensor for sensing temperature of the servo signal generator; and
   a decision section for determining, by the temperature sensed, whether or not the correction value should be updated, to generate an update signal, and for determining, by the amount of time that has passed since the correction value was updated last time, whether or not the first type of offset should be detected to generate a detection signal,
   wherein if the detection signal instructs that the first type of offset should be detected and if the update signal instructs that the correction value should be updated, then the offset detector detects the first type of actual offset and the corrector outputs the first type of the actual offset as the correction value.

3. The optical disc drive according to claim 2, further comprising a detection controller for generating a blocking signal instructing whether or not the read signal should be blocked,
   wherein if the detection signal instructs that the first type of offset should be detected, then the detection controller generates the blocking signal instructing that the read signal should be blocked, and
   wherein in response to the blocking signal, the blocker blocks the read signal and passes the predetermined reference signal.

4. The optical disc drive according to claim 2, further comprising a detection controller for generating a blocking signal indicating whether or not the read signal should be blocked,
   wherein if the detection signal instructs that the first type of offset should be detected, then the detection controller generates the blocking signal instructing that the read signal should be blocked, and
   wherein in response to the blocking signal, the light source stops emitting the light.

5. The optical disc drive according to claim 2, further comprising:
   a lens driver for changing the position of the lens at least one of directions along the radius of the optical disc and perpendicular to the optical disc in accordance with a control signal; and
   a control signal generator for generating the control signal in response to the detection signal,
   wherein if the detection signal instructs that the first type of offset should be detected, then the control signal generator holds the value of the control signal.

6. The optical disc drive according to claim 2, wherein if a variation in the temperature sensed has exceeded a predetermined threshold value, the decision section generates the update signal instructing that the correction value should be updated.

7. The optical disc drive according to claim 2, further comprising a time keeper for keeping the amount of time passed,
   wherein if the amount of time passed has exceeded a predetermined threshold value, the decision section generates the update signal instructing that the correction value should be updated.

8. The optical disc drive according to claim 2, further comprising a temperature memory for storing the values of the temperatures sensed,
   wherein the calculator derives the second type of offset based on the temperature values stored on the temperature memory and on the first type of offsets.

9. The optical disc drive according to claim 8, wherein the temperature memory stores each of the temperature values thereon when an associated one of the first type of the offsets is stored on the memory, and
   wherein the calculator finds two of the temperature values, which are closest to, and next closest to, an actual one of the temperature values, from the temperature values on the temperature memory, and derives the second type of offset based on the first type of offsets that were stored on the memory when the two temperature values found were stored on the temperature memory.

10. The optical disc drive according to claim 1, further comprising:
  a sensor for sensing temperature of the servo signal generator; and
  a decision section for determining, by the temperature sensed, whether or not the correction value should be updated to generate an update signal, and for determining, by the amount of time that has passed since the correction value was updated last time, whether or not the first type of offset should be detected to generate a detection signal,
  wherein if the detection signal instructs that the first type of offset should not be detected and if the update signal instructs that the correction value should be updated, then the calculator derives the second type of offset.

11. The optical disc drive according to claim 1, further comprising:
  a sensor for sensing temperature of the servo signal generator; and
  a decision section for determining, by the temperature sensed, whether or not the correction value should be updated to generate an update signal, and for determining, by the amount of time that has passed since the correction value was updated last time, whether or not the first type of offset should be detected to generate a detection signal,
  wherein if the detection signal instructs that the first type of offset should not be detected and if the update signal instructs that the correction value should not be updated, then the corrector corrects the servo signal in accordance with an actual correction value.

12. The optical disc drive according to claim 1, further comprising an amplifier for amplifying the read signal to output the amplified signal,
  wherein the at least one blocker includes a first blocker and a second blocker, the first blocker passing one of the read signal and a first predetermined reference signal to the amplifier in response to a first blocking signal, the second blocker passing one of the output signal of the amplifier and a second predetermined reference signal to the servo signal generator, and
  wherein the offset detector further detects the output values of the amplifier, to which the first reference signal is supplied from the first blocker, as a third type of offsets of the amplifier that have been produced due to one of electric circuits of the amplifier, and
  wherein the memory further stores the third type of offsets detected, and
  wherein the calculator outputs one of the third type of actual offset and a fourth type of offset as the correction value, the calculator deriving the fourth type of the offset based on a variation rate of the third type of offsets stored and then outputting the fourth type of the offset.

13. The optical disc drive according to claim 12, further comprising:
  a first sensor for sensing the temperature of the amplifier;
  a second sensor for sensing the temperature of the servo signal generator; and
  a decision section for determining, by the temperatures of the amplifier and the servo signal generator sensed, whether or not the correction value should be updated to generate an update signal, and for determining, by the amount of time that has passed since the correction value was updated last time, whether or not the first and third types of offsets need to be detected to generate a detection signal,
  wherein if the detection signal instructs that the third type of offset should be detected and if the update signal instructs that the correction value should be updated, then the offset detector detects the third type of the actual offset and the corrector outputs the third type of the actual offset as the correction value.

14. The optical disc drive according to claim 1, wherein no matter whether the optical disc drive is reading or writing data from/onto the optical disc,
  the offset detector detects the first type of offsets, the memory stores the first type of offsets thereon, and the calculator outputs the correction value.

15. The optical disc drive according to claim 1, wherein the servo signal is at least one of a tracking error signal and a focus error signal.

16. A method for controlling an optical disc drive that is used to read and/or write data from/on an optical disc having a data storage layer, the method comprising steps of:
  emitting light;
  converging the light;
  detecting the light reflected from the optical disc to output a read signal;
  selectively passing, as an output signal, one of the read signal and a predetermined reference signal;
  generating a servo signal in response to the output signal;
  detecting the servo signal that has been generated in response to the reference signal as a first type of offset that has been superposed on the servo signal;
  storing the first type of offsets detected;
  outputting one of the first type of actual offset and a second type of offset as a correction value with the second type of the offset derived based on a variation rate of the first type of the offset stored; and
  correcting the servo signal in accordance with the correction value.

* * * * *